US009848522B2

(12) United States Patent
Bassett

(10) Patent No.: US 9,848,522 B2
(45) Date of Patent: *Dec. 26, 2017

(54) AGRICULTURAL SYSTEM

(71) Applicant: Dawn Equipment Company, Sycamore, IL (US)

(72) Inventor: Joseph D. Bassett, Sycamore, IL (US)

(73) Assignee: Dawn Equipment Company, Sycamore, IL (US)

(*) Notice: Subject to any disclaimer, the term of this patent is extended or adjusted under 35 U.S.C. 154(b) by 16 days.

This patent is subject to a terminal disclaimer.

(21) Appl. No.: 14/858,089

(22) Filed: Sep. 18, 2015

(65) Prior Publication Data
US 2016/0128263 A1 May 12, 2016

Related U.S. Application Data

(60) Provisional application No. 62/085,334, filed on Nov. 28, 2014, provisional application No. 62/076,767, filed on Nov. 7, 2014.

(51) Int. Cl.
*A01B 63/111* (2006.01)
*A01B 63/00* (2006.01)
(Continued)

(52) U.S. Cl.
CPC ........ *A01B 63/008* (2013.01); *A01B 63/1115* (2013.01); *G01L 1/02* (2013.01)

(58) Field of Classification Search
CPC ... A01B 63/1115; A01B 63/111; A01B 63/10; A01B 63/02; A01B 63/00; A01B 63/28;
(Continued)

(56) References Cited

U.S. PATENT DOCUMENTS

| 114,002 A | 4/1871 | Godfrey |
|---|---|---|
| 321,906 A | 7/1885 | McCormick |

(Continued)

FOREIGN PATENT DOCUMENTS

| BE | 551372 | 10/1956 |
|---|---|---|
| CA | 530673 | 9/1956 |

(Continued)

OTHER PUBLICATIONS

Case Corporation Brochure, Planters 900 Series Units/Modules Product Information, Aug. 1986 (4 pages).

(Continued)

*Primary Examiner* — Christopher J. Novosad
(74) *Attorney, Agent, or Firm* — Nixon Peabody LLP

(57) ABSTRACT

A gauge wheel load sensor for an agricultural planter having a row unit that includes a pivotably mounted gauge wheel and a down pressure controller for controlling the down pressure on at least a portion of the row unit. The load sensor includes a mechanical element mounted for movement in response to the downward force applied to the row unit; a fluid-containing device containing a movable element coupled to the mechanical element for changing the fluid pressure in response to the movement of the mechanical element; and a transducer coupled to the fluid-containing device for producing an output signal in response to changes in the fluid pressure. An energy storage device, such as an accumulator, may be coupled to the fluid-containing device for receiving a limited amount of fluid in response to changes in the fluid pressure to damp pressure spikes in the output signal of the transducer.

10 Claims, 20 Drawing Sheets

(51) Int. Cl.
*A01B 63/28* (2006.01)
*G01L 1/02* (2006.01)

(58) Field of Classification Search
CPC ....... A01B 63/24; A01B 63/14; A01B 63/008; A01B 63/002; G01L 1/02; G01L 1/00
See application file for complete search history.

(56) References Cited

U.S. PATENT DOCUMENTS

| | | |
|---|---|---|
| 353,491 A | 2/1886 | Wells |
| 523,508 A | 7/1894 | Bauer |
| 736,369 A | 8/1903 | Dynes |
| 803,088 A | 10/1905 | Barker |
| 1,134,462 A | 4/1915 | Kendrick |
| 1,158,023 A | 10/1915 | Beaver |
| 1,247,744 A | 11/1917 | Trimble |
| 1,260,752 A | 3/1918 | Casaday |
| 1,321,040 A | 11/1919 | Hoffman |
| 1,391,593 A | 9/1921 | Sweeting |
| 1,398,668 A | 11/1921 | Bordsen |
| 1,791,462 A | 2/1931 | Bermel |
| 1,844,255 A | 2/1932 | Kaupke |
| 1,901,299 A | 3/1933 | Johnson |
| 1,901,778 A | 3/1933 | Schlag |
| 2,014,334 A | 9/1935 | Johnson |
| 2,058,539 A | 10/1936 | Welty |
| 2,269,051 A | 1/1942 | Cahoy |
| 2,341,143 A | 2/1944 | Herr |
| 2,505,276 A | 4/1950 | Boroski |
| 2,561,763 A | 7/1951 | Waters |
| 2,593,176 A | 4/1952 | Patterson |
| 2,596,527 A | 5/1952 | Bushong |
| 2,611,306 A | 9/1952 | Strehlow |
| 2,612,827 A | 10/1952 | Baggette |
| 2,664,040 A | 12/1953 | Beard |
| 2,691,353 A | 10/1954 | Secondo |
| 2,692,544 A | 10/1954 | Jessup |
| 2,715,286 A | 8/1955 | Saveson |
| 2,754,622 A | 7/1956 | Rohnert |
| 2,771,044 A | 11/1956 | Putifer |
| 2,773,343 A | 12/1956 | Oppel |
| 2,777,373 A | 1/1957 | Pursche |
| 2,799,234 A | 7/1957 | Chancey |
| 2,805,574 A | 9/1957 | Jackson, Jr. |
| 2,925,872 A | 2/1960 | Darnell |
| 2,960,358 A | 11/1960 | Christison |
| 3,010,744 A | 11/1961 | Hollis |
| 3,014,547 A | 12/1961 | Van der Lely |
| 3,038,424 A | 6/1962 | Johnson |
| 3,042,121 A | 7/1962 | Broetzman |
| 3,057,092 A | 10/1962 | Curlett |
| 3,058,243 A | 10/1962 | McGee |
| 3,065,879 A | 11/1962 | Jennings |
| 3,110,973 A | 11/1963 | Reynolds |
| 3,122,901 A | 3/1964 | Thompson |
| 3,123,152 A | 3/1964 | Biskis |
| 3,188,989 A | 6/1965 | Johnston |
| 3,213,514 A | 10/1965 | Evans |
| 3,250,109 A | 5/1966 | Spyridakis |
| 3,314,278 A | 4/1967 | Bergman |
| 3,319,589 A | 5/1967 | Moran |
| 3,351,139 A | 11/1967 | Schmitz |
| 3,355,930 A | 12/1967 | Fedorov |
| 3,368,788 A | 2/1968 | Padula |
| 3,368,789 A | 2/1968 | Martin |
| 3,370,450 A | 2/1968 | Scheucher |
| 3,420,273 A | 1/1969 | Greer |
| 3,447,495 A | 6/1969 | Miller |
| 3,539,020 A | 11/1970 | Andersson |
| 3,543,603 A | 12/1970 | Gley |
| 3,561,541 A | 2/1971 | Woelfel |
| 3,576,098 A | 4/1971 | Brewer |
| 3,581,685 A | 6/1971 | Taylor |
| 3,593,720 A | 7/1971 | Botterill |
| D221,461 S | 8/1971 | Hagenstad |
| 3,606,745 A | 9/1971 | Girodat |
| 3,635,495 A | 1/1972 | Orendorff |
| 3,650,334 A | 3/1972 | Hagenstad |
| 3,653,446 A | 4/1972 | Kalmon |
| 3,701,327 A | 10/1972 | Krumholz |
| 3,708,019 A | 1/1973 | Ryan |
| 3,718,191 A | 2/1973 | Williams |
| 3,749,035 A | 7/1973 | Cayton |
| 3,753,341 A | 8/1973 | Berg, Jr. |
| 3,766,988 A | 10/1973 | Whitesides |
| 3,774,446 A | 11/1973 | Diehl |
| 3,795,291 A | 3/1974 | Naito |
| 3,939,846 A | 2/1976 | Drozhzhin |
| 3,945,532 A | 3/1976 | Marks |
| 3,975,890 A | 8/1976 | Rodger |
| 4,009,668 A | 3/1977 | Brass |
| 4,018,101 A | 4/1977 | Mihalic |
| 4,044,697 A | 8/1977 | Swanson |
| 4,055,126 A | 10/1977 | Brown |
| 4,058,171 A | 11/1977 | van der Lely |
| 4,063,597 A | 12/1977 | Day |
| 4,096,730 A | 6/1978 | Martin |
| 4,099,576 A | 7/1978 | Jilani |
| 4,122,715 A | 10/1978 | Yokoyama |
| 4,129,082 A | 12/1978 | Betulius |
| 4,141,200 A | 2/1979 | Johnson |
| 4,141,302 A | 2/1979 | Morrison, Jr. |
| 4,141,676 A | 2/1979 | Jannen |
| 4,142,589 A | 3/1979 | Schlagenhauf |
| 4,147,305 A | 4/1979 | Hunt |
| 4,149,475 A | 4/1979 | Bailey |
| 4,157,661 A | 6/1979 | Schindel |
| 4,173,259 A | 11/1979 | Heckenkamp |
| 4,182,099 A | 1/1980 | Davis |
| 4,187,916 A | 2/1980 | Harden |
| 4,191,262 A | 3/1980 | Sylvester |
| 4,194,575 A | 3/1980 | Whalen |
| 4,196,567 A | 4/1980 | Davis |
| 4,196,917 A | 4/1980 | Oakes |
| 4,206,817 A | 6/1980 | Bowerman |
| 4,208,974 A | 6/1980 | Dreyer |
| 4,213,408 A | 7/1980 | West |
| 4,225,191 A | 9/1980 | Knoski |
| 4,233,803 A | 11/1980 | Davis |
| 4,241,674 A | 12/1980 | Mellinger |
| 4,249,613 A | 2/1981 | Scribner |
| 4,280,419 A | 7/1981 | Fischer |
| 4,295,532 A | 10/1981 | Williams |
| 4,301,870 A | 11/1981 | Carre |
| 4,307,674 A | 12/1981 | Jennings |
| 4,311,104 A | 1/1982 | Steilen |
| 4,317,355 A | 3/1982 | Hatsuno |
| 4,359,101 A | 11/1982 | Gagnon |
| 4,375,837 A | 3/1983 | van der Lely |
| 4,377,979 A | 3/1983 | Peterson |
| 4,391,335 A | 7/1983 | Birkenbach |
| 4,398,608 A | 8/1983 | Boetto |
| 4,407,371 A | 10/1983 | Hohl |
| 4,430,952 A | 2/1984 | Murray |
| 4,433,568 A | 2/1984 | Kondo |
| 4,438,710 A | 3/1984 | Paladino |
| 4,445,445 A | 5/1984 | Sterrett |
| 4,461,355 A | 7/1984 | Peterson |
| 4,481,830 A | 11/1984 | Smith |
| 4,499,775 A | 2/1985 | Lasoen |
| 4,506,610 A | 3/1985 | Neal |
| 4,508,178 A | 4/1985 | Cowell |
| 4,528,920 A | 7/1985 | Neumeyer |
| 4,530,405 A | 7/1985 | White |
| 4,537,262 A | 8/1985 | van der Lely |
| 4,538,688 A | 9/1985 | Szucs |
| 4,550,122 A | 10/1985 | David |
| 4,553,607 A | 11/1985 | Behn |
| 4,580,506 A | 4/1986 | Fleischer |
| 4,596,200 A | 6/1986 | Gafford |
| 4,598,654 A | 7/1986 | Robertson |
| 4,603,746 A | 8/1986 | Swales |
| 4,604,906 A | 8/1986 | Scarpa |
| 4,630,773 A | 12/1986 | Ortlip |

(56) References Cited

U.S. PATENT DOCUMENTS

| | | |
|---|---|---|
| 4,643,043 A | 2/1987 | Furuta |
| 4,646,620 A | 3/1987 | Buchl |
| 4,646,850 A | 3/1987 | Brown |
| 4,650,005 A | 3/1987 | Tebben |
| 4,669,550 A | 6/1987 | Sittre |
| 4,671,193 A | 6/1987 | States |
| 4,674,578 A | 6/1987 | Bexten |
| 4,703,809 A | 11/1987 | Van den Ende |
| 4,726,304 A | 2/1988 | Dreyer |
| 4,738,461 A | 4/1988 | Stephenson |
| 4,744,316 A | 5/1988 | Lienemann |
| 4,762,075 A | 8/1988 | Halford |
| 4,765,190 A | 8/1988 | Strubbe |
| 4,768,387 A | 9/1988 | Kemp |
| 4,779,684 A | 10/1988 | Schultz |
| 4,785,890 A | 11/1988 | Martin |
| 4,825,957 A | 5/1989 | White |
| 4,825,959 A | 5/1989 | Wilhelm |
| 4,920,901 A | 5/1990 | Pounds |
| 4,926,767 A | 5/1990 | Thomas |
| 4,930,431 A | 6/1990 | Alexander |
| 4,986,367 A | 1/1991 | Kinzenbaw |
| 4,998,488 A | 3/1991 | Hansson |
| 5,015,997 A | 5/1991 | Strubbe |
| 5,027,525 A | 7/1991 | Haukaas |
| 5,033,397 A | 7/1991 | Colburn, Jr. |
| 5,065,632 A | 11/1991 | Reuter |
| 5,074,227 A | 12/1991 | Schwitters |
| 5,076,180 A | 12/1991 | Schneider |
| 5,092,255 A | 3/1992 | Long |
| 5,113,957 A | 5/1992 | Tamai |
| 5,129,282 A | 7/1992 | Bassett |
| 5,136,934 A | 8/1992 | Darby, Jr. |
| 5,190,112 A | 3/1993 | Johnston |
| 5,224,553 A | 7/1993 | Heintzman |
| 5,234,060 A | 8/1993 | Carter |
| 5,240,080 A | 8/1993 | Bassett |
| 5,255,617 A | 10/1993 | Williams |
| 5,269,237 A | 12/1993 | Baker |
| 5,282,389 A | 2/1994 | Faivre |
| 5,285,854 A | 2/1994 | Thacker |
| 5,333,694 A | 8/1994 | Roggenbuck |
| 5,337,832 A | 8/1994 | Bassett |
| 5,341,754 A | 8/1994 | Winterton |
| 5,346,019 A | 9/1994 | Kinzenbaw |
| 5,346,020 A | 9/1994 | Bassett |
| 5,349,911 A | 9/1994 | Holst |
| 5,351,635 A | 10/1994 | Hulicsko |
| 5,379,847 A | 1/1995 | Snyder |
| 5,394,946 A | 3/1995 | Clifton |
| 5,398,771 A | 3/1995 | Hornung |
| 5,419,402 A | 5/1995 | Heintzman |
| 5,427,192 A | 6/1995 | Stephenson |
| 5,443,023 A | 8/1995 | Carroll |
| 5,443,125 A | 8/1995 | Clark |
| 5,461,995 A | 10/1995 | Winterton |
| 5,462,124 A | 10/1995 | Rawson |
| 5,473,999 A | 12/1995 | Rawson |
| 5,474,135 A | 12/1995 | Schlagel |
| 5,477,682 A | 12/1995 | Tobiasz |
| 5,477,792 A | 12/1995 | Bassett |
| 5,479,868 A | 1/1996 | Bassett |
| 5,479,992 A | 1/1996 | Bassett |
| 5,485,796 A | 1/1996 | Bassett |
| 5,485,886 A | 1/1996 | Bassett |
| 5,497,717 A | 3/1996 | Martin |
| 5,497,837 A | 3/1996 | Kehrney |
| 5,499,683 A | 3/1996 | Bassett |
| 5,499,685 A | 3/1996 | Downing, Jr. |
| 5,517,932 A | 5/1996 | Ott |
| 5,524,525 A | 6/1996 | Nikkel |
| 5,531,171 A | 7/1996 | Whitesel |
| 5,542,362 A | 8/1996 | Bassett |
| 5,544,709 A | 8/1996 | Lowe |
| 5,562,165 A | 10/1996 | Janelle |
| 5,590,611 A | 1/1997 | Smith |
| 5,603,269 A | 2/1997 | Bassett |
| 5,623,997 A | 4/1997 | Rawson |
| 5,640,914 A | 6/1997 | Rawson |
| 5,657,707 A | 8/1997 | Dresher |
| 5,660,126 A | 8/1997 | Freed |
| 5,685,245 A | 11/1997 | Bassett |
| 5,704,430 A | 1/1998 | Smith |
| 5,709,271 A | 1/1998 | Bassett |
| 5,725,057 A | 3/1998 | Taylor |
| 5,727,638 A | 3/1998 | Wodrich |
| 5,852,982 A | 12/1998 | Peter |
| 5,868,207 A | 2/1999 | Langbakk |
| 5,878,678 A | 3/1999 | Stephens |
| RE36,243 E | 7/1999 | Rawson |
| 5,953,895 A | 9/1999 | Hobs |
| 5,970,891 A | 10/1999 | Schlagel |
| 5,970,892 A | 10/1999 | Wendling |
| 5,988,293 A | 11/1999 | Brueggen |
| 6,067,918 A | 5/2000 | Kirby |
| 6,068,061 A | 5/2000 | Smith |
| 6,091,997 A | 7/2000 | Flamme |
| 6,164,385 A | 12/2000 | Buchl |
| 6,223,663 B1 | 5/2001 | Wendling |
| 6,223,828 B1 | 5/2001 | Paulson |
| 6,237,696 B1 | 5/2001 | Mayerle |
| 6,253,692 B1 | 7/2001 | Wendling |
| 6,314,897 B1 | 11/2001 | Hagny |
| 6,325,156 B1 | 12/2001 | Barry |
| 6,330,922 B1 | 12/2001 | King |
| 6,331,142 B1 | 12/2001 | Bischoff |
| 6,343,661 B1 | 2/2002 | Thompson |
| 6,347,594 B1 | 2/2002 | Wendling |
| 6,382,326 B1 | 5/2002 | Goins |
| 6,389,999 B1 | 5/2002 | Duello |
| 6,453,832 B1 | 9/2002 | Schaffert |
| 6,454,019 B1 | 9/2002 | Prairie |
| 6,460,623 B1 | 10/2002 | Knussman |
| 6,516,595 B2 | 2/2003 | Rhody |
| 6,530,334 B2 | 3/2003 | Hagny |
| 6,575,104 B2 | 6/2003 | Brummelhuis |
| 6,644,224 B1 | 11/2003 | Bassett |
| 6,681,868 B2 | 1/2004 | Kovach |
| 6,701,856 B1 | 3/2004 | Zoke |
| 6,701,857 B1 | 3/2004 | Jensen |
| 6,715,433 B1 | 4/2004 | Friestad |
| 6,786,130 B2 | 9/2004 | Steinlage |
| 6,834,598 B2 | 12/2004 | Jüptner |
| 6,840,853 B2 | 1/2005 | Foth |
| 6,886,650 B2 | 5/2005 | Bremmer |
| 6,912,963 B2 | 7/2005 | Bassett |
| 6,968,907 B1 | 11/2005 | Raper |
| 6,986,313 B2 | 1/2006 | Halford |
| 6,997,400 B1 | 2/2006 | Hanna |
| 7,004,090 B2 | 2/2006 | Swanson |
| 7,044,070 B2 | 5/2006 | Kaster |
| 7,063,167 B1 | 6/2006 | Staszak |
| 7,159,523 B2 | 1/2007 | Bourgault |
| 7,222,575 B2 | 5/2007 | Bassett |
| 7,290,491 B2 | 11/2007 | Summach |
| 7,360,494 B2 | 4/2008 | Martin |
| 7,360,495 B1 | 4/2008 | Martin |
| 7,438,006 B2 | 10/2008 | Mariman |
| 7,451,712 B2 | 11/2008 | Bassett |
| 7,523,709 B1 | 4/2009 | Kiest |
| 7,540,333 B2 | 6/2009 | Bettin |
| 7,575,066 B2 | 8/2009 | Bauer |
| 7,584,707 B2 | 9/2009 | Sauder |
| 7,665,539 B2 | 2/2010 | Bassett |
| 7,673,570 B1 | 3/2010 | Bassett |
| 7,743,718 B2 | 6/2010 | Bassett |
| 7,870,827 B2 | 1/2011 | Bassett |
| 7,918,285 B1 | 4/2011 | Graham |
| 7,938,074 B2 | 5/2011 | Liu |
| 7,944,210 B2 | 5/2011 | Fischer |
| 7,946,231 B2 | 5/2011 | Martin |
| 8,146,519 B2 | 4/2012 | Bassett |
| 8,151,717 B2 | 4/2012 | Bassett |
| 8,171,707 B2 | 5/2012 | Kitchel |

(56) References Cited

U.S. PATENT DOCUMENTS

| | | |
|---|---|---|
| D663,326 S | 7/2012 | Allensworth |
| 8,327,780 B2 | 12/2012 | Bassett |
| 8,359,988 B2 | 1/2013 | Bassett |
| 8,380,356 B1 | 2/2013 | Zielke |
| 8,386,137 B2 | 2/2013 | Sauder |
| 8,393,407 B2 | 3/2013 | Freed |
| 8,408,149 B2 | 4/2013 | Rylander |
| 6,644,224 C1 | 6/2013 | Bassett |
| 6,912,963 C1 | 6/2013 | Bassett |
| 7,222,575 C1 | 6/2013 | Bassett |
| 8,544,397 B2 | 10/2013 | Bassett |
| 8,544,398 B2 | 10/2013 | Bassett |
| 8,550,020 B2 | 10/2013 | Sauder |
| 8,573,319 B1 | 11/2013 | Casper |
| 8,634,992 B2 | 1/2014 | Sauder |
| 8,636,077 B2 | 1/2014 | Bassett |
| 8,763,713 B2 | 7/2014 | Bassett |
| 8,770,308 B2 | 7/2014 | Bassett |
| 8,776,702 B2 | 7/2014 | Bassett |
| RE45,091 E | 8/2014 | Bassett |
| 8,863,857 B2 | 10/2014 | Bassett |
| 8,910,581 B2 | 12/2014 | Bassett |
| 8,985,232 B2 | 3/2015 | Bassett |
| 9,055,712 B2 | 6/2015 | Bassett |
| 9,107,337 B2 | 8/2015 | Bassett |
| 9,107,338 B2 | 8/2015 | Bassett |
| 9,113,589 B2 | 8/2015 | Bassett |
| 9,144,187 B2 | 9/2015 | Bassett |
| 9,167,740 B2 | 10/2015 | Bassett |
| 9,192,089 B2 | 11/2015 | Bassett |
| 9,192,091 B2 | 11/2015 | Bassett |
| 9,215,838 B2 | 12/2015 | Bassett |
| 9,215,839 B2 | 12/2015 | Bassett |
| 9,226,440 B2 | 1/2016 | Bassett |
| 9,232,687 B2 | 1/2016 | Bassett |
| 9,241,438 B2 | 1/2016 | Bassett |
| 9,271,437 B2 | 3/2016 | Martin |
| 9,307,690 B2 | 4/2016 | Bassett |
| 2002/0162492 A1 | 11/2002 | Juptner |
| 2004/0005929 A1 | 1/2004 | Piasecki |
| 2006/0102058 A1 | 5/2006 | Swanson |
| 2006/0191695 A1 | 8/2006 | Walker et al. |
| 2006/0237203 A1 | 10/2006 | Miskin |
| 2007/0044694 A1 | 3/2007 | Martin |
| 2007/0272134 A1 | 11/2007 | Baker |
| 2008/0093093 A1 | 4/2008 | Sheppard |
| 2008/0173220 A1 | 7/2008 | Wuertz |
| 2008/0236461 A1 | 10/2008 | Sauder |
| 2008/0256916 A1 | 10/2008 | Vaske |
| 2010/0019471 A1 | 1/2010 | Ruckle |
| 2010/0108336 A1 | 5/2010 | Thomson |
| 2010/0180695 A1 | 7/2010 | Sauder |
| 2010/0198529 A1 | 8/2010 | Sauder |
| 2010/0282480 A1 | 11/2010 | Breker |
| 2011/0247537 A1 | 10/2011 | Freed |
| 2011/0313575 A1 | 12/2011 | Kowalchuk |
| 2012/0167809 A1 | 7/2012 | Bassett |
| 2012/0186216 A1 | 7/2012 | Vaske |
| 2012/0216731 A1 | 8/2012 | Schilling |
| 2012/0232691 A1 | 9/2012 | Green |
| 2012/0255475 A1 | 10/2012 | Mariman |
| 2013/0032363 A1 | 2/2013 | Curry |
| 2013/0112121 A1 | 5/2013 | Achen |
| 2013/0112124 A1 | 5/2013 | Bergen |
| 2013/0213676 A1 | 8/2013 | Bassett |
| 2013/0325267 A1 | 12/2013 | Adams |
| 2013/0333599 A1 | 12/2013 | Bassett |
| 2014/0026748 A1 | 1/2014 | Stoller |
| 2014/0034339 A1 | 2/2014 | Sauder |
| 2014/0034343 A1 | 2/2014 | Sauder |
| 2014/0034344 A1 | 2/2014 | Bassett |
| 2014/0060864 A1 | 3/2014 | Martin |
| 2014/0116735 A1* | 5/2014 | Bassett .............. A01B 61/044 172/2 |
| 2014/0190712 A1 | 7/2014 | Bassett |
| 2014/0224513 A1 | 8/2014 | Van Buskirt |
| 2015/0237791 A1 | 8/2015 | Bassett |
| 2015/0373901 A1 | 12/2015 | Bassett |
| 2016/0066498 A1 | 3/2016 | Bassett |
| 2016/0100520 A1 | 4/2016 | Bassett |
| 2016/0128265 A1 | 5/2016 | Bassett |

FOREIGN PATENT DOCUMENTS

| | | |
|---|---|---|
| DE | 335464 | 9/1921 |
| DE | 1108971 | 6/1961 |
| DE | 24 02 411 | 7/1975 |
| EP | 2 196 337 B1 | 6/2010 |
| EP | 2 497 348 A1 | 9/2012 |
| GB | 1 574 412 | 9/1980 |
| GB | 2 056 238 A | 10/1982 |
| JP | 54-57726 | 5/1979 |
| SU | 392897 | 8/1973 |
| SU | 436778 | 7/1974 |
| SU | 611201 | 6/1978 |
| SU | 625648 | 9/1978 |
| SU | 1410884 A1 | 7/1988 |
| SU | 1466674 | 3/1989 |
| WO | WO 2009/145381 A1 | 12/2009 |
| WO | WO 2011/161140 A1 | 12/2011 |
| WO | WO 2012/149367 A1 | 1/2012 |
| WO | WO 2012/149415 A1 | 1/2012 |
| WO | WO 2012/167244 A1 | 12/2012 |
| WO | WO 2013/025898 A1 | 2/2013 |

OTHER PUBLICATIONS

Buffalo Farm Equipment All Flex Cultivator Operator Manual, Apr. 1990 (7 pages).
Shivvers, Moisture Trac 3000 Brochure, Aug. 21, 1990 (5 pages).
The New Farm, "*New Efficiencies in Nitrogen Application*," Feb. 1991, p. 6 (1 page).
Hiniker Company, Flow & Acreage Continuous Tracking System Monitor Demonstration Manual, date estimated as Feb. 1991 (7 pages).
Russnogle, John, "*Sky Spy: Gulf War Technology Pinpoints Field and Yields*," Top Producer, A Farm Journal Publication, Nov. 1991, pp. 12-14 (4 pages).
Borgelt, Steven C., "*Sensor Technologies and Control Strategies for Managing Variability*," University of Missouri, Apr. 14-16, 1992 (15 pages).
Buffalo Farm Equipment Catalog on Models 4600, 4630, 4640, and 4620, date estimated as early as Feb. 1992 (4 pages).
Hiniker 5000 Cultivator Brochure, date estimated as early as Feb. 1992 (4 pages).
Hiniker Series 5000 Row Cultivator Rigid and Folding Toolbar Operator's Manual, date estimated as early as Feb. 1992 (5 pages).
Orthman Manufacturing, Inc., Rowcrop Cultivator Booklet, date estimated as early as Feb. 1992 (4 pages).
Yetter Catalog, date estimated as early as Feb. 1992 (4 pages).
Exner, Rick, "*Sustainable Agriculture: Practical Farmers of Iowa Reducing Weed Pressure in Ridge-Till*," Iowa State University University Extension, http://www.extension.iastate.edu/Publications/SA2.pdf, Jul. 1992, Reviewed Jul. 2009, retrieved Nov. 2, 2012 (4 pages).
Finck, Charlene, "*Listen to Your Soil*," Farm Journal Article, Jan. 1993, pp. 14-15 (2 pages).
Acu-Grain, "*Combine Yield Monitor 99% Accurate? 'You Bet Your Bushels*!!'" date estimated as early as Feb. 1993 (2 pages).
John Deere, New 4435 Hydro Row-Crop and Small-Grain Combine, date estimated as early as Feb. 1993 (8 pages).
Vansichen, R. et al., "*Continuous Wheat Yield Measurement on a Combine*," date estimated as early as Feb. 1993 (5 pages).
Yetter 2010 Product Catalog, date estimated as early as Jan. 2010 (2 pages).
Yetter Cut and Move Manual, Sep. 2010 (28 pages).
John Deere, Seat Catalog, date estimated as early Sep. 2011 (19 pages).

(56) References Cited

OTHER PUBLICATIONS

Martin Industries, LLC Paired 13" Spading Closing Wheels Brochure, date estimated as early as Jun. 6, 2012, pp. 18-25 (8 pages).
Vogt, Willie, "*Revisiting Robotics*," http://m.farmindustrynews.com/farm-equipment/revisiting-robotics, Dec. 19, 2013 (3 pages).
John Deere, New Semi-Active Sea Suspension, http://www.deere.com/en_US/parts/agparts/semiactiveseat.html, date estimated as early as Jan. 2014, retrieved Feb. 6, 2014 (2 pages).
International Search Report for PCT Application No. PCT/US2015/059631 dated Mar. 3, 2016 (6 pages).
Written Opinion for PCT Application No. PCT/US2015/059631 dated Mar. 3, 2016 (6 pages).

* cited by examiner

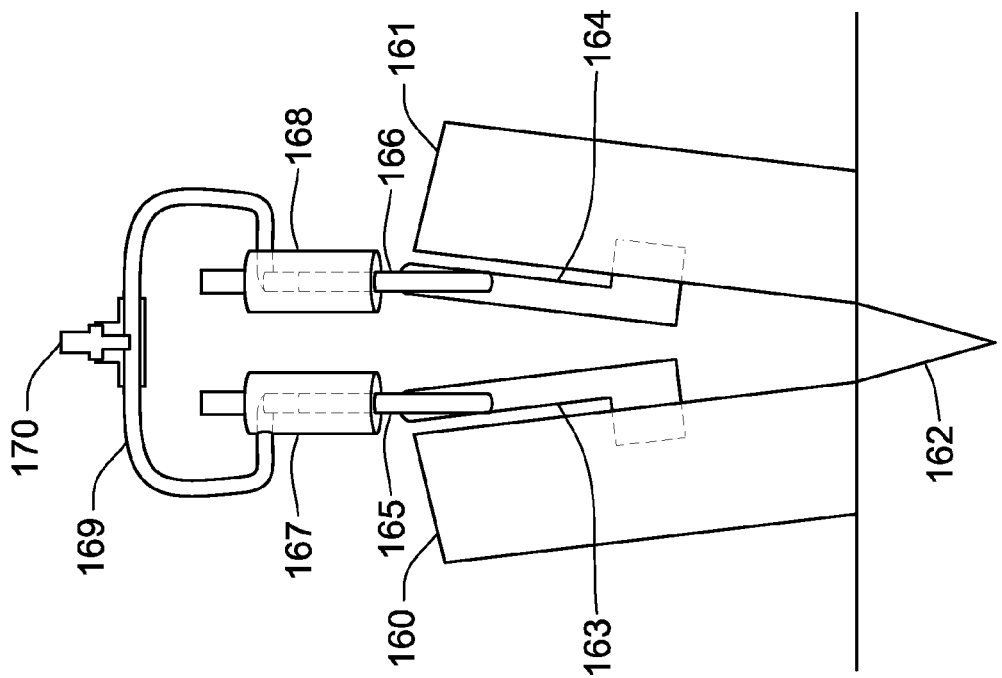
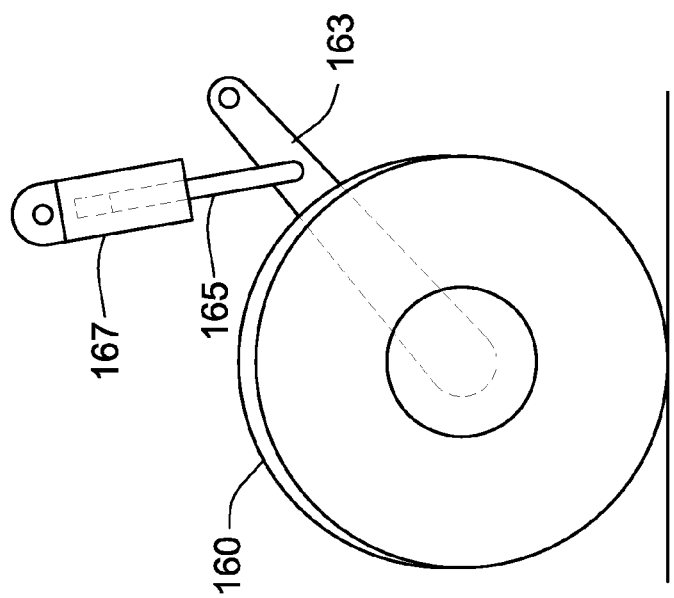
FIG. 18A
FIG. 18B

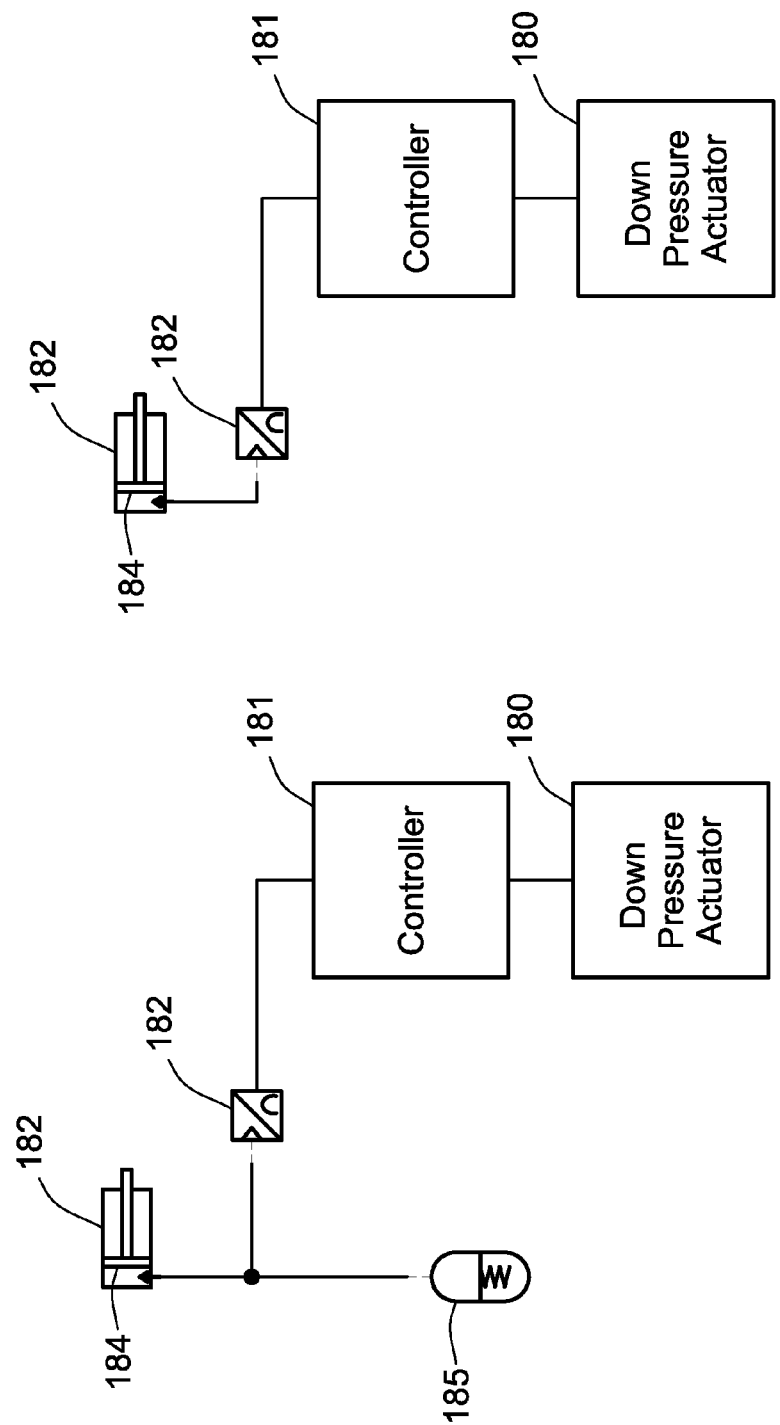

AGRICULTURAL SYSTEM

CROSS-REFERENCE TO RELATED APPLICATIONS

This application claims priority to U.S. Provisional Application No. 62/085,334, filed Nov. 28, 2014; and U.S. Provisional Application No. 62/076,767, filed Nov. 7, 2014, each of which is hereby incorporated by reference herein in its entirety.

FIELD OF THE INVENTION

This invention relates generally to agricultural planters and, more particularly, to gauge wheel load sensors and down pressure control systems for agricultural planters.

BRIEF SUMMARY

In accordance with one embodiment, a gauge wheel load sensor is provided for an agricultural planter having a row unit that includes a pivotably mounted gauge wheel and a down pressure controller for controlling the down pressure on at least a portion of the row unit. The load sensor includes a mechanical element mounted for movement in response to the downward force applied to the row unit; a fluid-containing device containing a movable element coupled to the mechanical element for changing the fluid pressure in response to the movement of the mechanical element; and a transducer coupled to the fluid-containing device for producing an output signal in response to changes in the fluid pressure.

A modified embodiment includes an energy storage device coupled to the fluid-containing device for receiving a limited amount of fluid in response to changes in the fluid pressure to damp pressure spikes in the output signal of the transducer. In one implementation, the fluid-containing device is a hydraulic cylinder, the movable element is a piston in the cylinder, and the energy storage device is an accumulator receiving pressurized fluid from the fluid-containing device and containing a movable element responsive to the pressure of the fluid received from the fluid-containing device.

In accordance with another embodiment, an agricultural planter row unit comprises a pivotably mounted gauge wheel and a down pressure controller for controlling the elevation of the row unit; a pair of gauge wheel support arms mounted for pivoting movement independently of each other; a gauge wheel equalizer arm extending transversely across the support arms and mounted for pivoting movement about an axis extending in the direction of travel of the row unit; a pair of contact rollers mounted on opposite ends of the equalizer arm, each of the contact rollers engaging different ones of the support arms for pivoting the equalizer arm in response to the independent vertical movements of the support arms. In one implementation, the a rocker arm is coupled to the center of the equalizer arm and mounted for pivoting movement in response to changes in the elevation of the center of the equalizer arm.

In accordance with another embodiment, a gauge wheel load sensor is provided for an agricultural planter having a row unit that includes a pivotably mounted gauge wheel and a down pressure controller for controlling the down pressure on at least a portion of the row unit. The load sensor comprises the load sensor comprises a mechanical element mounted for movement in response to the downward force applied to the gauge wheel; a fluid-containing device containing a movable element coupled to the mechanical element for changing the fluid pressure in response to the movement of the mechanical element, and a transducer coupled to the fluid-containing device for producing an output signal in response to changes in the fluid pressure. The mechanical element is preferably a ram in a hydraulic cylinder containing pressurized fluid, and the ram is coupled to the gauge wheel so that the ram is moved within the cylinder in response to vertical movement of the gauge wheel. The ram may be coupled to the gauge wheel so that the ram is advanced within the cylinder to increase the fluid pressure only in response to a change in the down force on the gauge wheel. The load sensor may also include an accumulator coupled to the portion of the fluid-containing device where the fluid pressure increases in response to the movement of the mechanical element. The ram may be coupled to the gauge wheel so that the ram is moved within the cylinder in response to vertical movement of the gauge wheel, and which includes an accumulator coupled to the hydraulic cylinder for receiving a portion of the pressurized fluid. The accumulator preferably includes a ram in a cavity that receives the pressurized fluid, so that the accumulator damps changes in the pressure of the fluid in response to vibratory movement of the ram.

In accordance with a further embodiment, a gauge wheel load sensor is provided for an agricultural planter having a row unit that includes a pivotably mounted gauge wheel and a down pressure controller for controlling the down pressure on at least a portion of the row unit. The load sensor comprises a mechanical element mounted for movement in response to the downward force applied to the gauge wheel; a fluid-containing device containing a movable element coupled to the mechanical element for changing the fluid pressure in the device in response to the movement of the mechanical element; a transducer coupled to the fluid-containing device for producing an output signal in response to changes in the fluid pressure; and an energy storage device coupled to the fluid-containing device for receiving a limited amount of fluid in response to changes in the fluid pressure to damp pressure spikes in the output signal of the transducer. The fluid-containing device is preferably a hydraulic cylinder, and the movable element is a piston in the cylinder, and the energy storage device is preferably an accumulator receiving pressurized fluid from the fluid-containing device, the accumulator containing a movable element responsive to the pressure of the fluid received from the fluid-containing device.

Yet another embodiment provides an agricultural planter row unit comprising a pivotably mounted gauge wheel and a down pressure controller for controlling the elevation of the row unit; a pair of gauge wheel support arms mounted for pivoting movement independently of each other; a gauge wheel equalizer arm extending transversely across the support arms and mounted for pivoting movement about an axis extending in the direction of travel of the row unit, and a pair of contact rollers mounted on opposite ends of the equalizer arm, each of the contact rollers engaging different ones of the support arms for pivoting the equalizer arm in response to the independent vertical movements of the support arms. The row unit preferably includes a rocker arm coupled to the center of the equalizer arm and mounted for pivoting movement in response to changes in the elevation of the center of the equalizer arm.

BRIEF DESCRIPTION OF THE DRAWINGS

FIG. 18A is a side elevation of a modified sensing system for detecting the pressure exerted on a pair of gauge wheels.

FIG. 18B is an end elevation of the system shown in FIG. 18A.

FIG. 21 is a schematic diagram of a second modified hydraulic and electrical control system for controlling a down pressure actuator.

FIG. 22 is a schematic diagram of a third modified hydraulic and electrical control system for controlling a down pressure actuator.

DETAILED DESCRIPTION

An agricultural planter typically includes a number of individual row units, each of which includes its own row cleaner device, row opener device and row closing device. The down pressure is typically controlled separately for each row unit or each of several groups of row units, and is preferably controlled separately for one or more of the individual devices in each row unit, as described in more detail in pending U.S. application Ser. No. 14/146,822 filed Jan. 3, 2014, which is incorporated by reference herein in its entirety.

Figure 1:
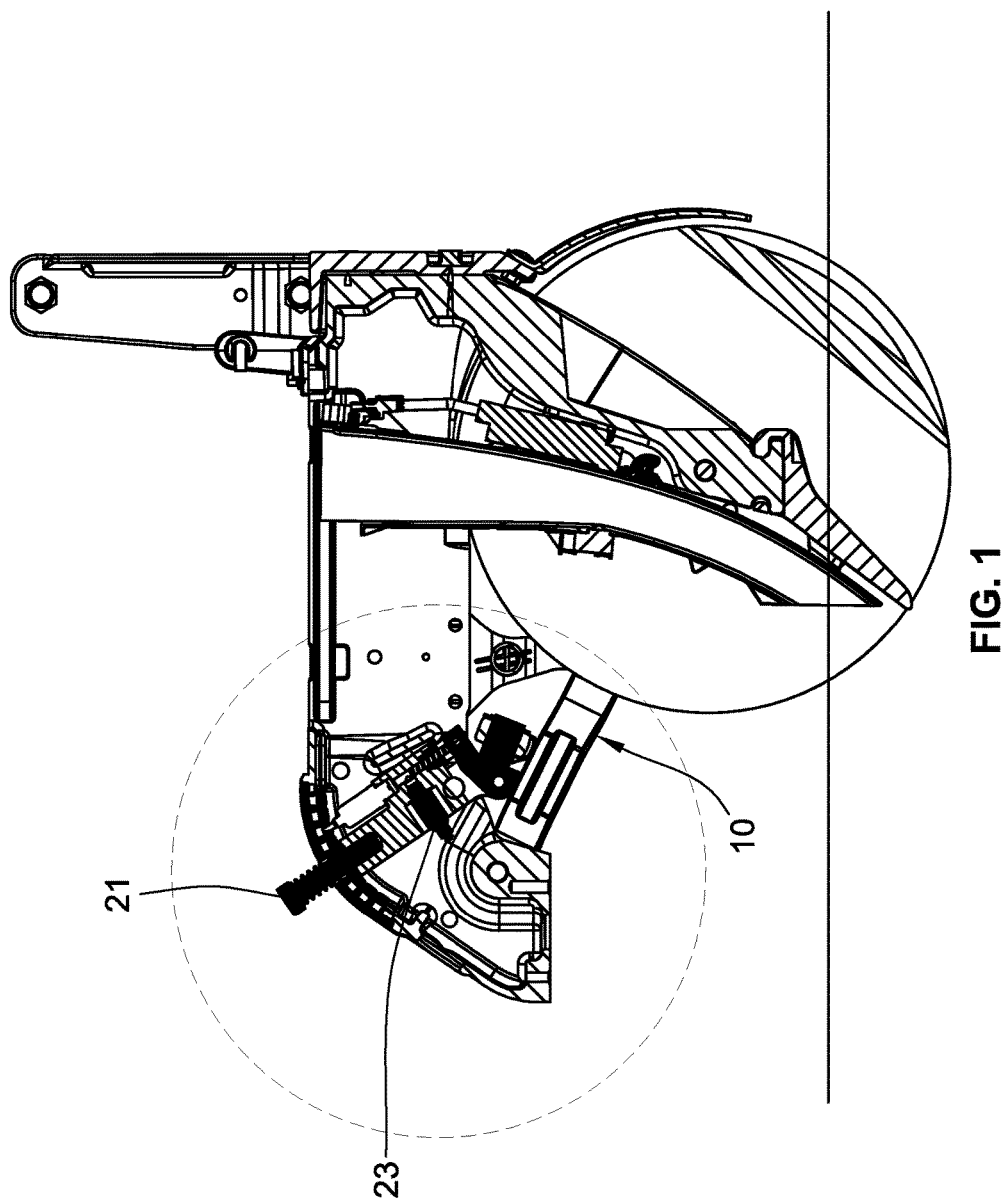
FIG. 1 is a vertical longitudinal section through a portion of an agricultural planter that includes a gauge wheel and an opener device.
Figure 2:
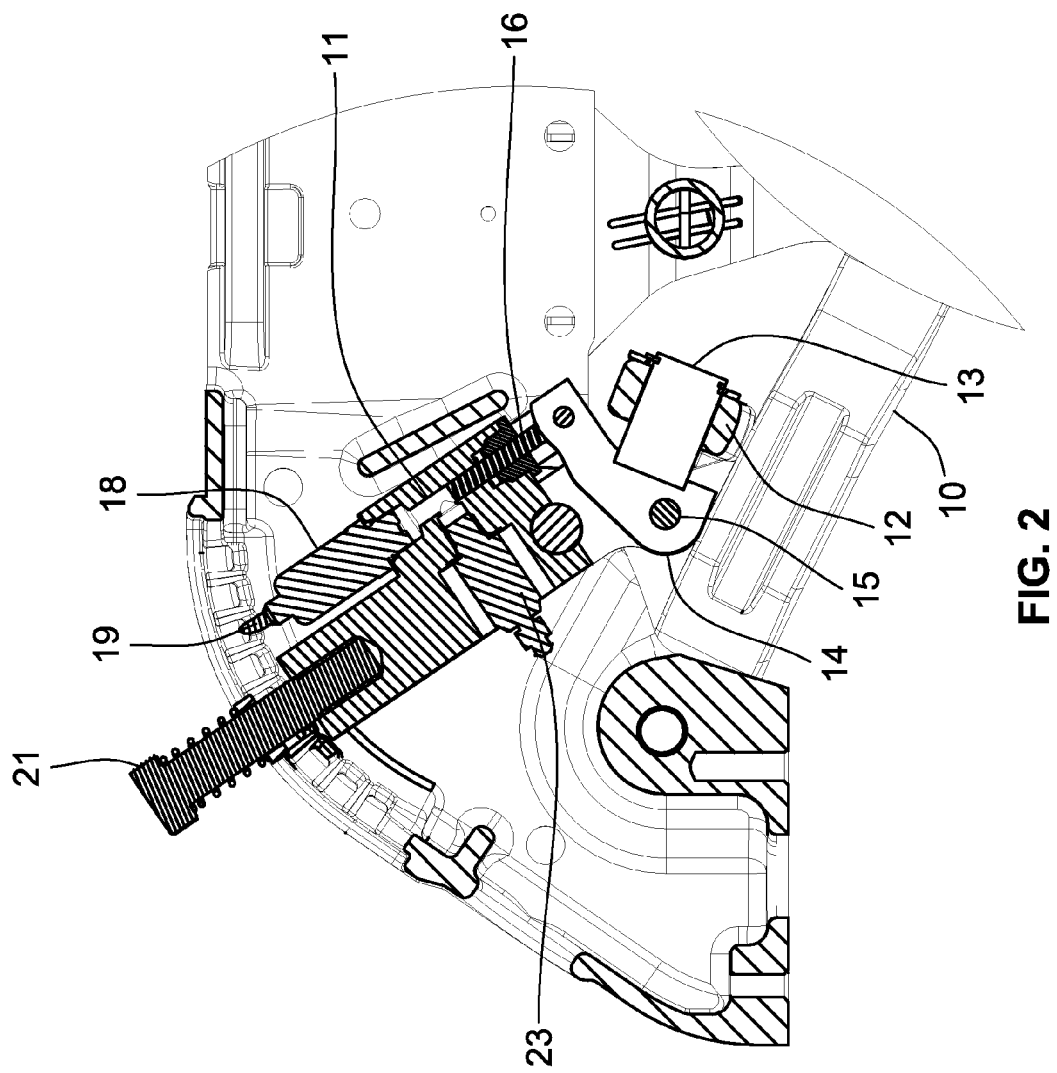
FIG. 2 is an enlargement of the left side of FIG. 1.
Figure 3:
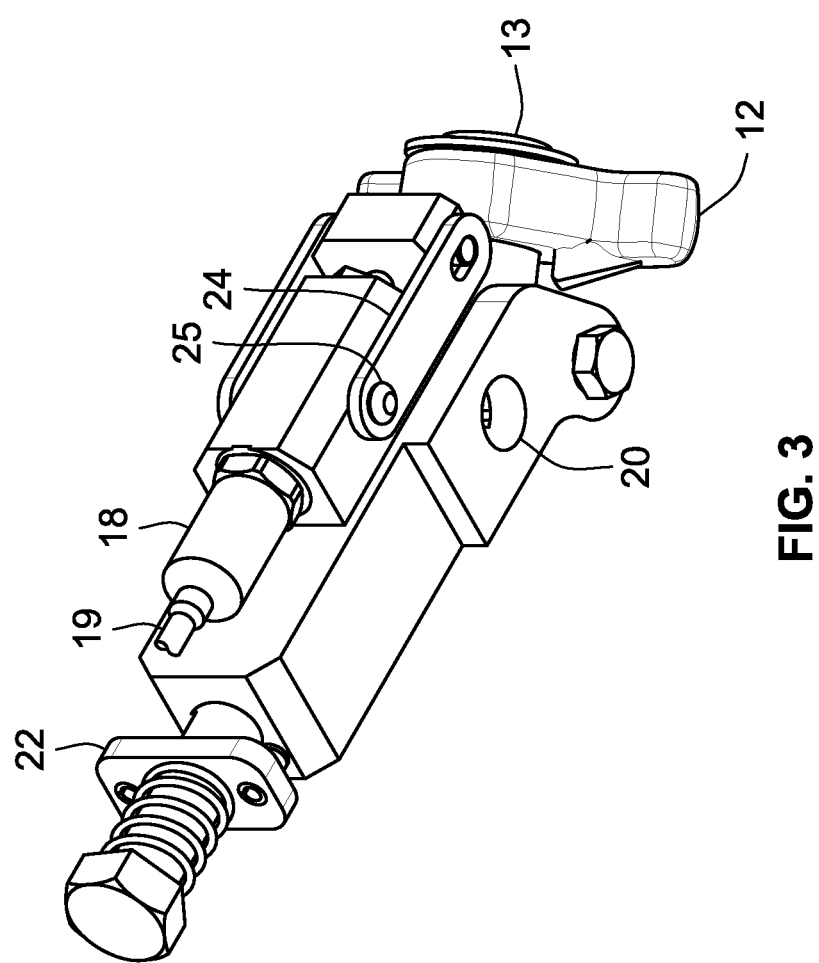
FIG. 3 is a bottom perspective of the control portion of the equipment shown in FIG. 1.
Figure 4:
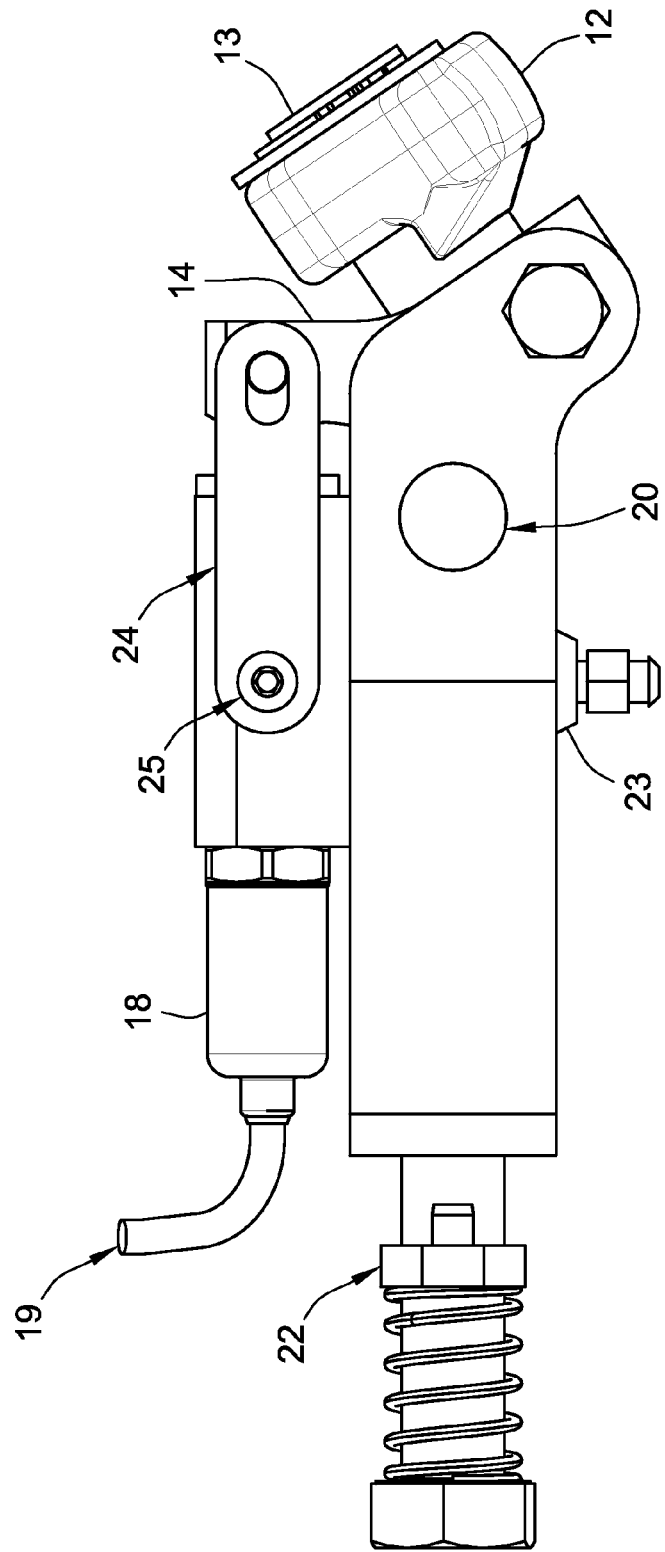
FIG. 4 is an enlarged side elevation of the equipment shown in FIG. 3.
Figure 5:
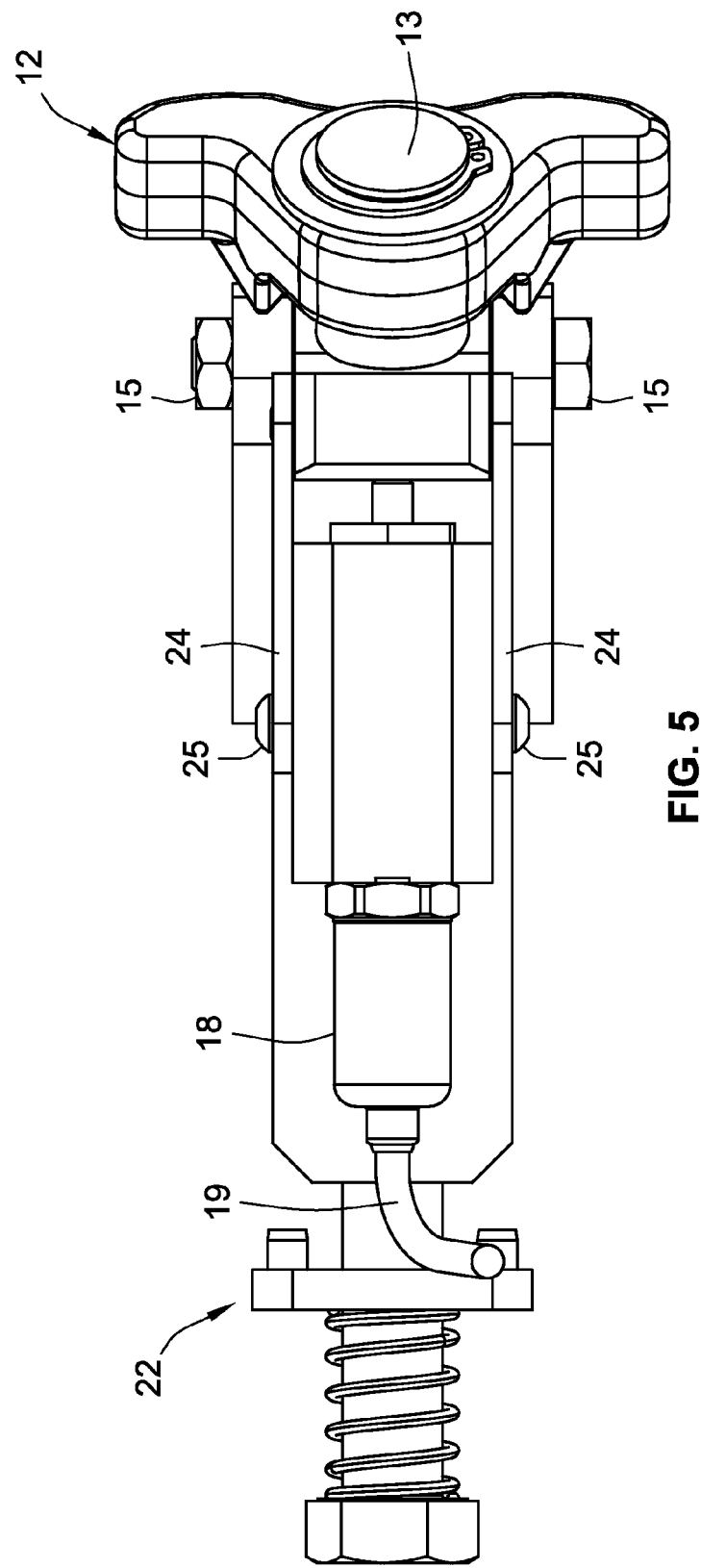
FIG. 5 is an enlarged top plan view of the equipment shown in FIG. 3.
Figure 6:
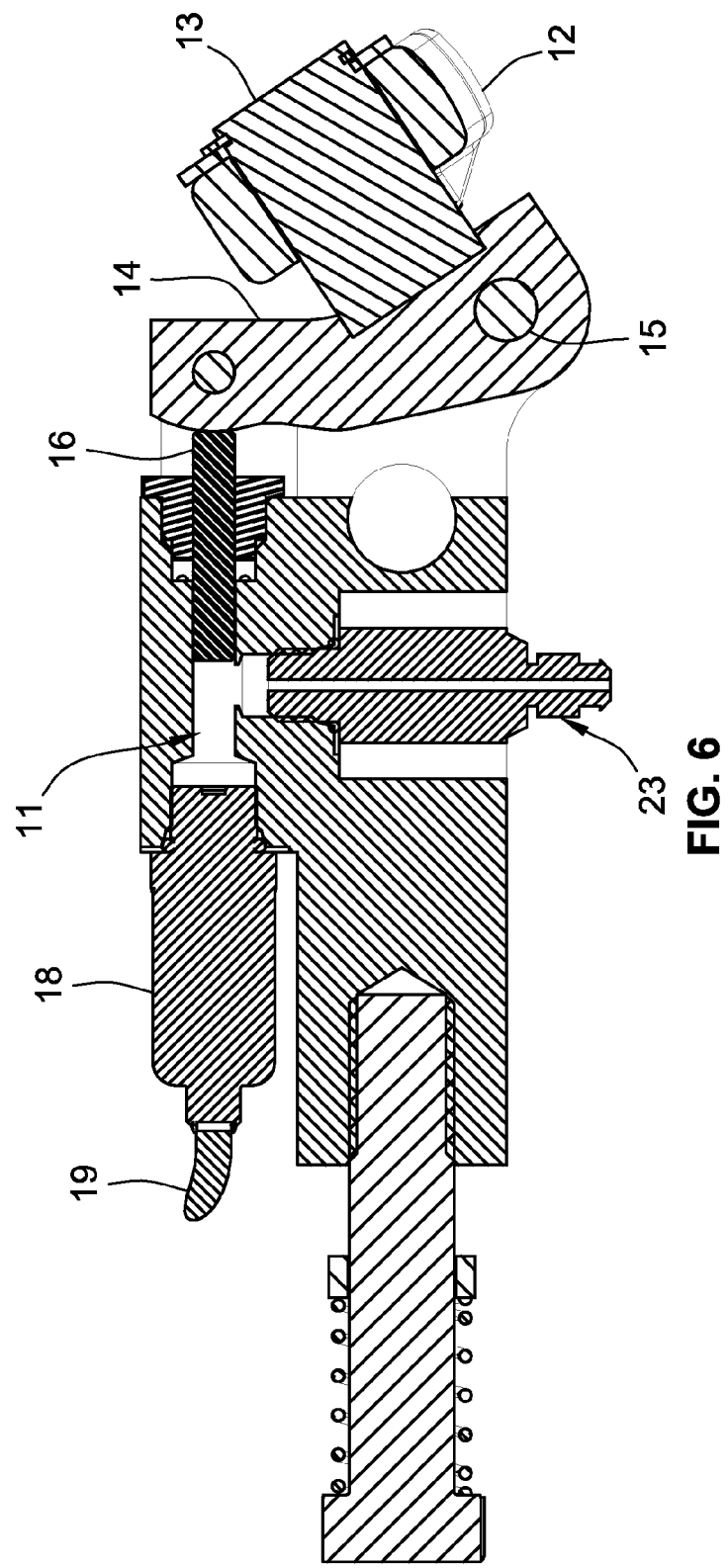
FIG. 6 is an enlarged vertical longitudinal section through the equipment shown in FIG. 3.

FIGS. 1-6 illustrate an improved gauge wheel load sensor that takes the upward force from a pivoting planter gauge wheel support, such as the pivoting support arms 10 in the row unit equipment shown in FIGS. 1 and 2, and translates that force into a fluid pressure in a fluid chamber 11. The gauge wheel support arms push against an equalizer support 12, which is connected via a pivot 13 with a rocker/cam 14. The force on the gauge wheel due to the weight of the row unit and applied down force causes the rocker/cam 14 to pivot around a pivot bolt 15 and push against a hydraulic ram 16. This force on the ram 16 causes the fluid in the chamber 11 to pressurize. The pressure is proportional to the amount of gauge wheel load. A pressure transducer 18 reads the amount of pressure and sends a signal to a row unit down pressure controller via signal line 19. This signal allows the planter row unit down pressure to be controlled to a desired level.

Depth adjustment is accomplished in the conventional sense by pivoting the assembly around a pivot 20, and locking a handle 21 into the desired position with a mechanism 22. With this design it is preferred that that there is no air trapped in the fluid chamber 11. For this reason the mechanism includes a bleed valve 23. The process for removal of air is to extend the ram to the maximum extent with calibration/travel limiter plates 24 (FIG. 4) removed. The system is then filled completely with fluid with the bleed valve 23 closed. Then the bleed valve 23 is opened, and the rocker arm 14 is pushed against the ram 16 to move the ram to the exact place where the calibration/travel limit plates 24 allow a calibration plate retaining screw 25 to fit into a hole. This ensures that each assembly is set the same so all the row units of the planter are at the same depth. At this point the bleed valve 23 is closed. With all air removed, the mechanical/fluid system will act as a rigid member against forces in compression. The travel limiter plate 24 keeps a cam pivot weldment from falling down when the planter is lifted off the ground.

Standard industry practice is to use a strain gauge to directly measure the planter gauge wheel load. The design shown in FIGS. 1-6 is an improvement over the state of the art because it allows the sensor to measure only the down force on the gauge wheels. In typical designs using strain gauge type sensors, the mechanical linkage that allows the gauge wheels to oscillate causes the measured wheel force to have substantial noise due to changes in the force being applied. For this reason it can be difficult to determine which parts of the signal correspond to actual changes in down force on the gauge wheels, versus signal changes that are due to movement of components of the gauge wheel support mechanism. The reason for this is that strain gauge sensors will only measure the force that is being applied in a single plane. Because of the linkage and pivot assembly that is used on typical planters, the force being applied to the strain gauge type designs can change based on the depth setting or whether the planter gauge wheels are oscillating over terrain. In this way they will tend to falsely register changes in gauge wheel down force and make it difficult to have a closed loop down pressure response remain consistent.

The fluid seal of the pressure sensor described here creates friction in the system which has the effect of damping out high frequency noise. Agricultural fields have very small scale variations in the surface which cause noise to be produced in the typical down force sensor apparatus. By using fluid pressure this invention decouples the sensor from the mechanical linkage and allows the true gauge wheel force to be more accurately measured. Lowering the amount of systematic noise in the gauge wheel load output sensor makes it easier to produce an automatic control system that accurately responds to true changes in the hardness of the soil, as opposed to perceived changes in soil hardness due to noise induced on the sensor.

Figure 7:
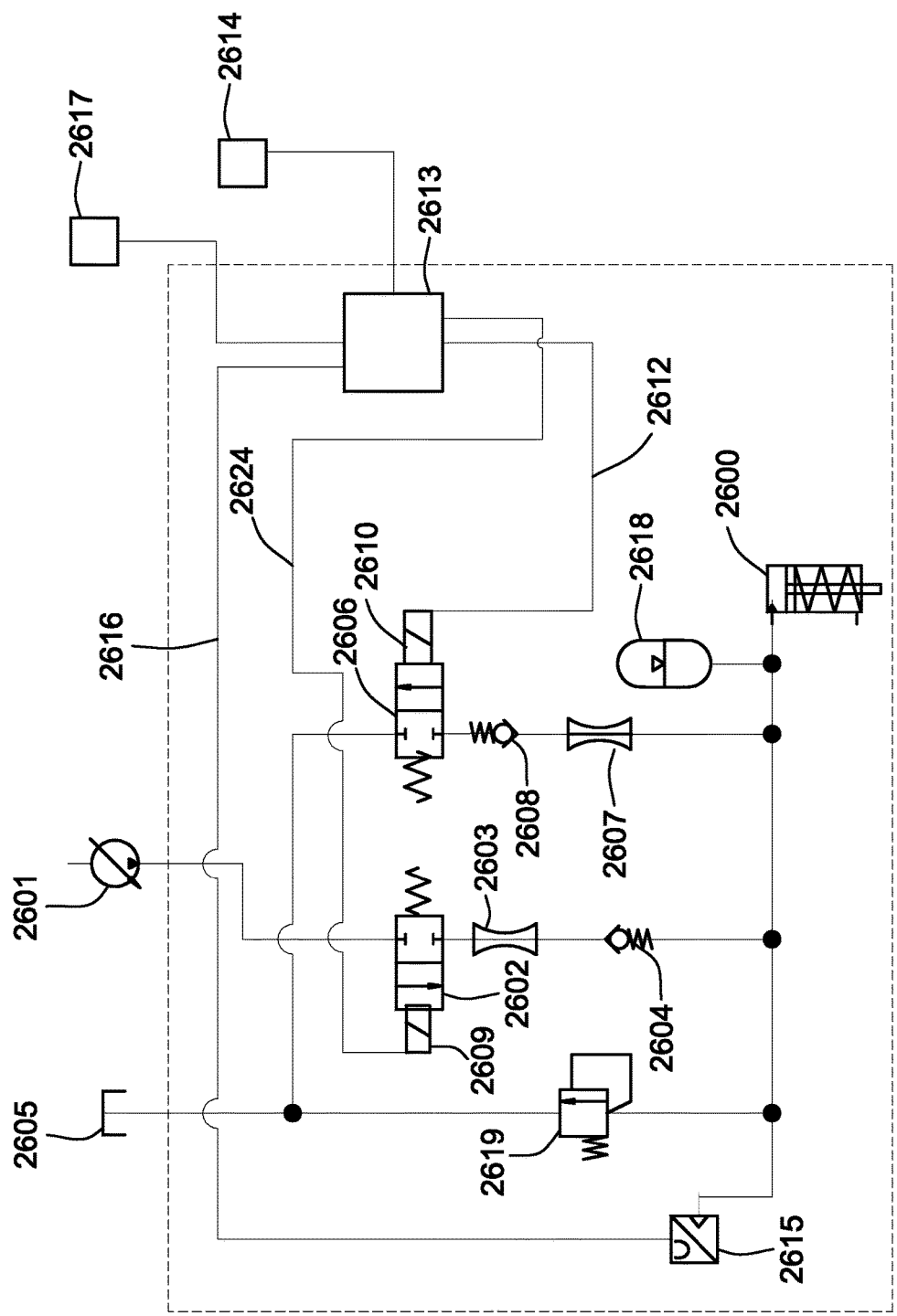
FIG. 7 is a schematic diagram of a hydraulic control system for controlling the hydraulic system using a gauge wheel load sensor.

FIG. 7 is a schematic diagram of a hydraulic control system for any or all of the hydraulic actuators in a down pressure control system. The hydraulic cylinder 2600 is supplied with pressurized hydraulic fluid from a source 2601 via a first controllable two-position control valve 2602, a restriction 2603 and a check valve 2604. The pressurized hydraulic fluid supplied to the cylinder 2600 can be returned from the cylinder to a sump 2605 via a second controllable two-position control valve 2606, a restriction 2607 and a check valve 2608. Both the control valves 2602 and 2606 are normally closed, but can be opened by energizing respective actuators 2609 and 2610, such as solenoids. Electrical signals for energizing the actuators 2609 and 2610 are supplied to the respective actuators via lines 2611 and 2612 from a controller 2613, which in turn may be controlled by a central processor 2614. The controller 2613 receives input signals from a plurality of sensors, which in the example of FIG. 7 includes a pressure transducer 2615 coupled to the hydraulic cylinder 2600 via line 2616, and a ground hardness sensor 2617. An accumulator 2618 is also coupled to the hydraulic cylinder 2600, and a relief valve 2619 connects the hydraulic cylinder 2600 to the sump 2605 in response to an increase in the pressure in the cylinder 2600 above a predetermined level.

To reduce the energy required from the limited energy source(s) available from the tractor or other propulsion device used to transport the row units over an agricultural field, the control valves 2602 and 2606 are preferably controlled with a pulse width modulation (PWM) control system implemented in the controller 2613. The PWM control system supplies short-duration (e.g., in the range of 50 milliseconds to 2 seconds with orifice sizes in the range of 0.020 to 0.2 inch) pulses to the actuators 2609 and 2610 of the respective control valves 2602 and 2606 to open the respective valves for short intervals corresponding to the widths of the PWM pulses. This significantly reduces the energy required to increase or decrease the pressure in the hydraulic cylinder 2600. The pressure on the exit side of the control valve is determined by the widths of the individual pulses and the number of pulses supplied to the control valves 2602 and 2606. Thus, the pressure applied to the hydraulic cylinder 2622 may be controlled by separately adjusting the two control valves 2602 and 2606 by changing the width and/or the frequency of the electrical pulses supplied to the respective actuators 2609 and 2610, by the controller 2613. This avoids the need for a constant supply current, which is a significant advantage when the only available power source is located on the tractor or other vehicle that propels the soil-engaging implement(s) across a field.

The hydraulic control system of FIG. 7 may be used to control multiple hydraulic cylinders on a single row unit or a group of row units, or may be replicated for each individual hydraulic cylinder on a row unit having multiple hydraulic cylinders. For example, in the system described above having a ground hardness sensor located out in front of the clearing wheels, it is desirable to have each hydraulic cylinder on any given row unit separately controlled so that the down pressure on each tool can be adjusted according to the location of that tool in the direction of travel. Thus, when the ground hardness sensor detects a region where the soil is softer because it is wet, the down pressure on each tool is preferably adjusted to accommodate the softer soil only during the time interval when that particular tool is traversing the wet area, and this time interval is different for each tool when the tools are spaced from each other in the direction of travel. In the case of a group of row units having multiple hydraulic cylinders on each row unit, the same hydraulic control system may control a group of valves having common functions on all the row units in a group.

Figure 8:
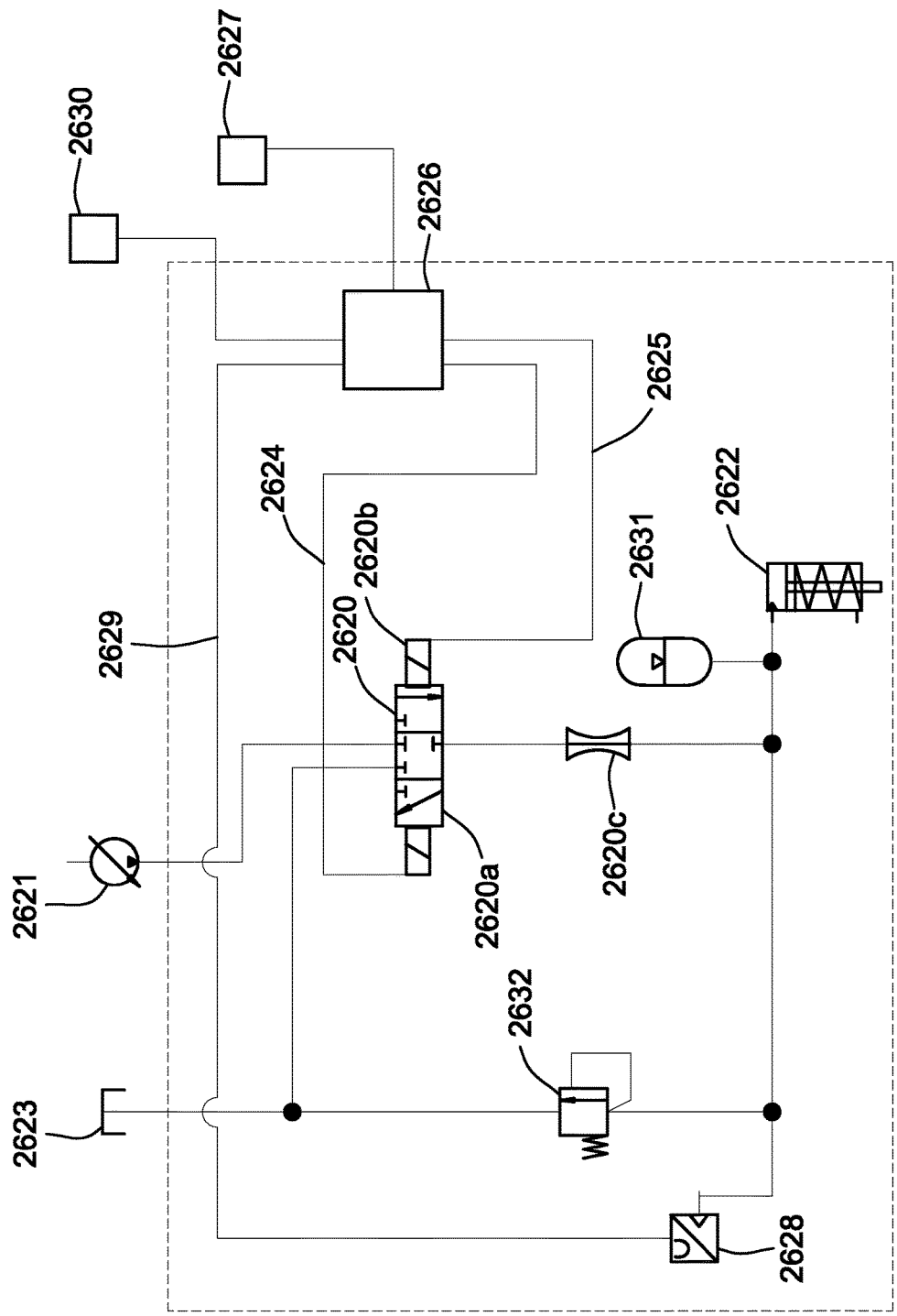
FIG. 8 is a schematic diagram of a modified hydraulic control system for controlling the hydraulic system using a gauge wheel load sensor.

FIG. 8 is a schematic diagram of a modified hydraulic control system that uses a single three-position control valve 2620 in place of the two two-position control valves and the two check valves used in the system of FIG. 7. The centered position of the valve 2620 is the closed position, which is the normal position of this valve. The valve 2620 has two actuators 2620*a* and 2620*b*, one of which moves the valve to a first open position that connects a source 2621 of pressurized hydraulic fluid to a hydraulic cylinder 2622 via restriction 2620*c*, and the other of which moves the valve to a second open position that connects the hydraulic cylinder 2622 to a sump 2623. Electrical signals for energizing the actuators 2620*a* and 2620*b* are supplied to the respective actuators via lines 2624 and 2625 from a controller 2626, which in turn may be controlled by a central processor 2627. The controller 2626 receives input signals from a pressure transducer 2628 coupled to the hydraulic cylinder 2622 via line 2629, and from an auxiliary sensor 2630, such as a ground hardness sensor. An accumulator 2631 is coupled to the hydraulic cylinder 2622, and a relief valve 2632 connects the hydraulic cylinder 2622 to the sump 2623 in response to an increase in the pressure in the cylinder 2622 above a predetermined level.

Figure 9:
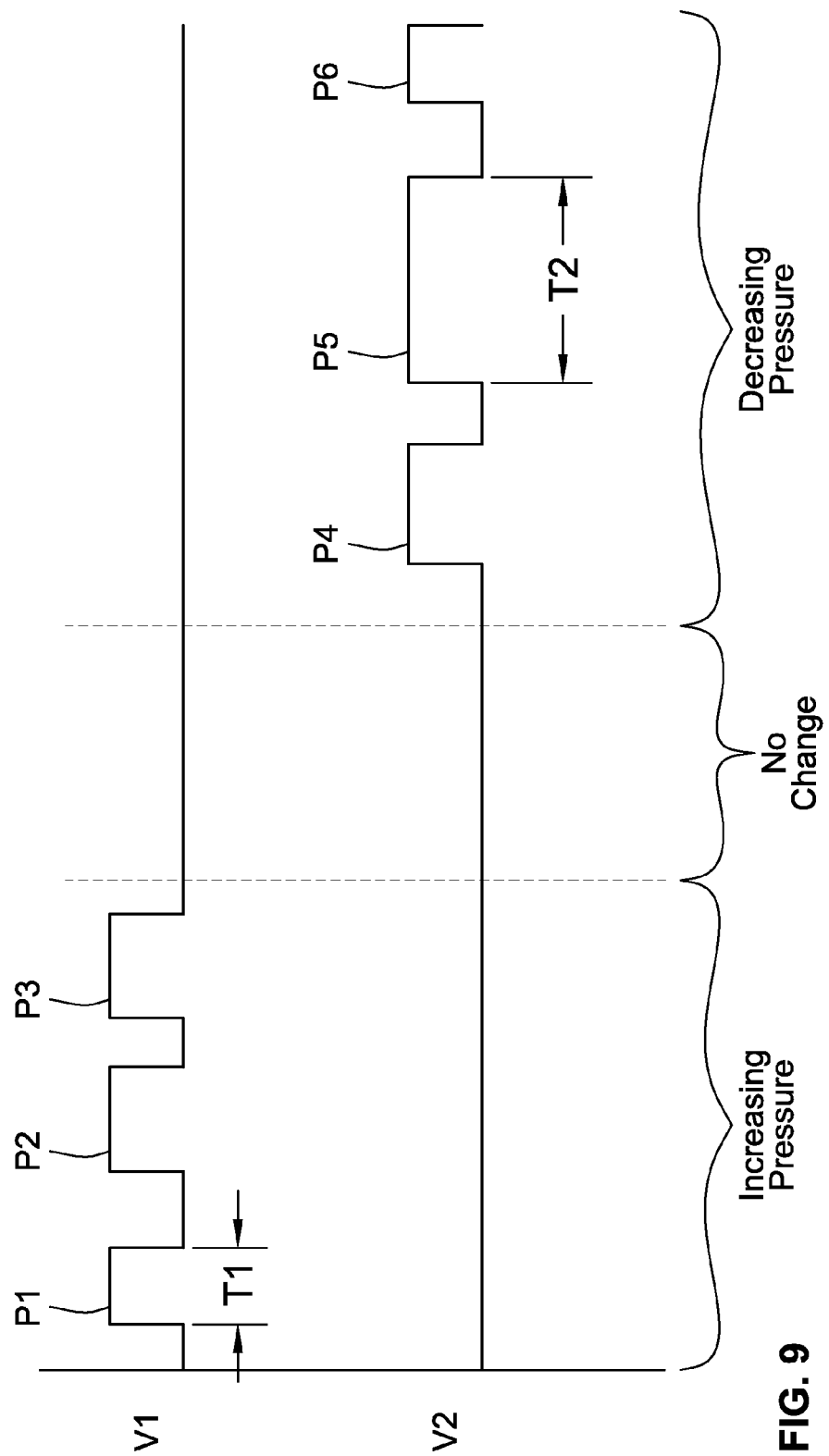
FIG. 9 is a waveform diagram illustrating different modes of operation provided by the hydraulic control systems of FIGS. 7 and 8.
Figure 10:
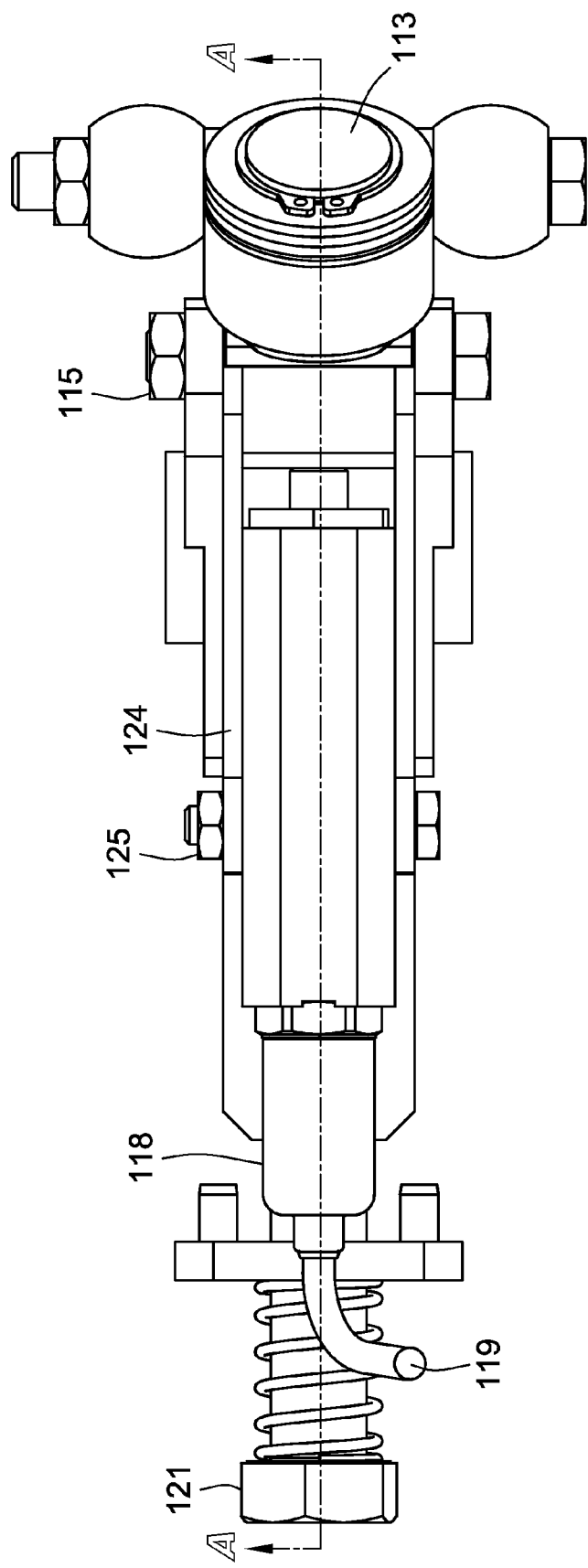
FIG. 10 is a plan view of a gauge wheel transducer system for an agricultural planter that includes a gauge wheel and an opener device.
Figure 11:
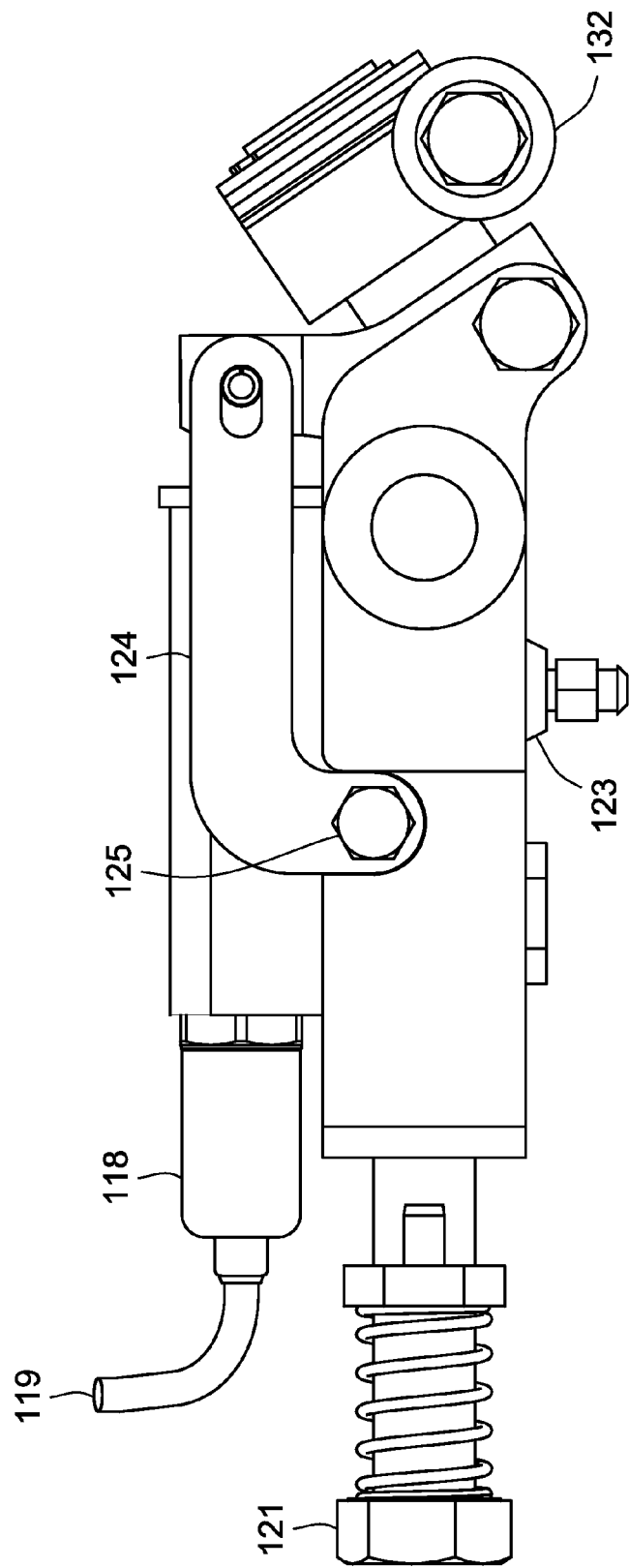
FIG. 11 is a side elevation of the transducer system shown in FIG. 10.
Figure 12:
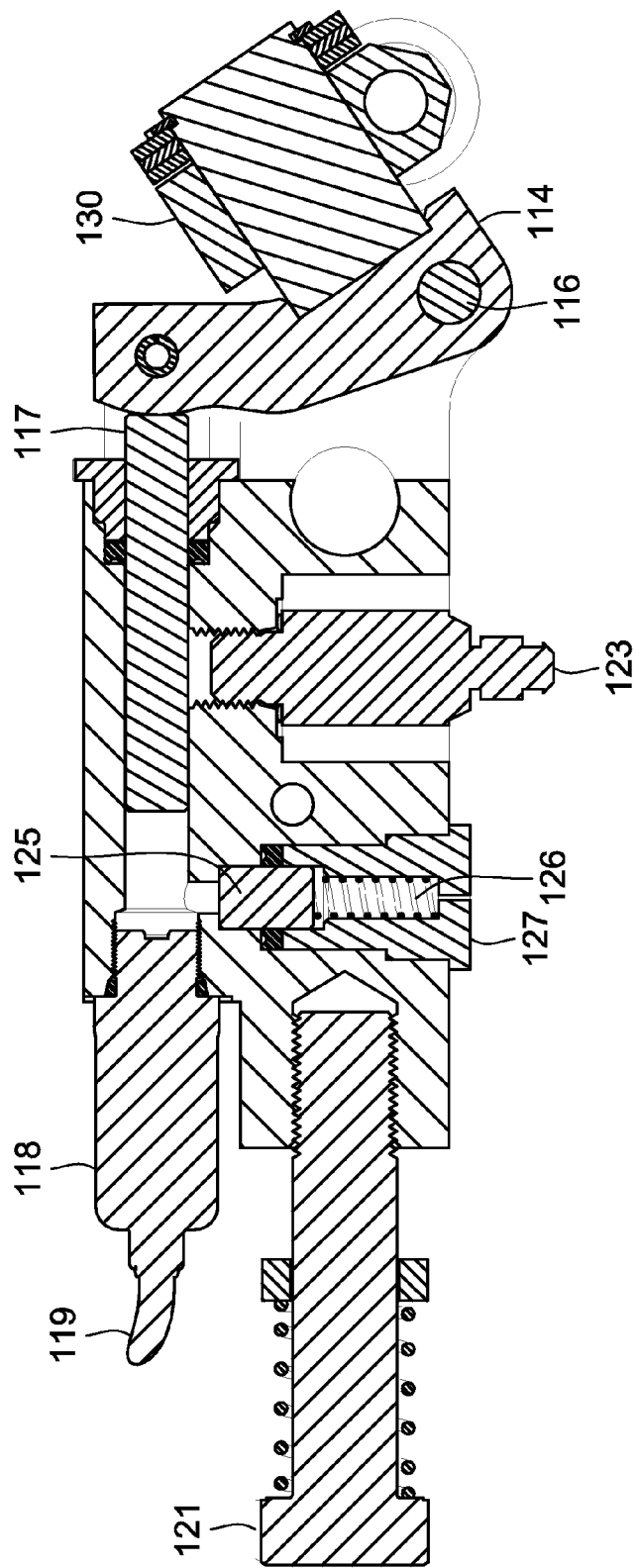
FIG. 12 is a sectional view taken along line A-A in FIG. 10.
Figure 13:
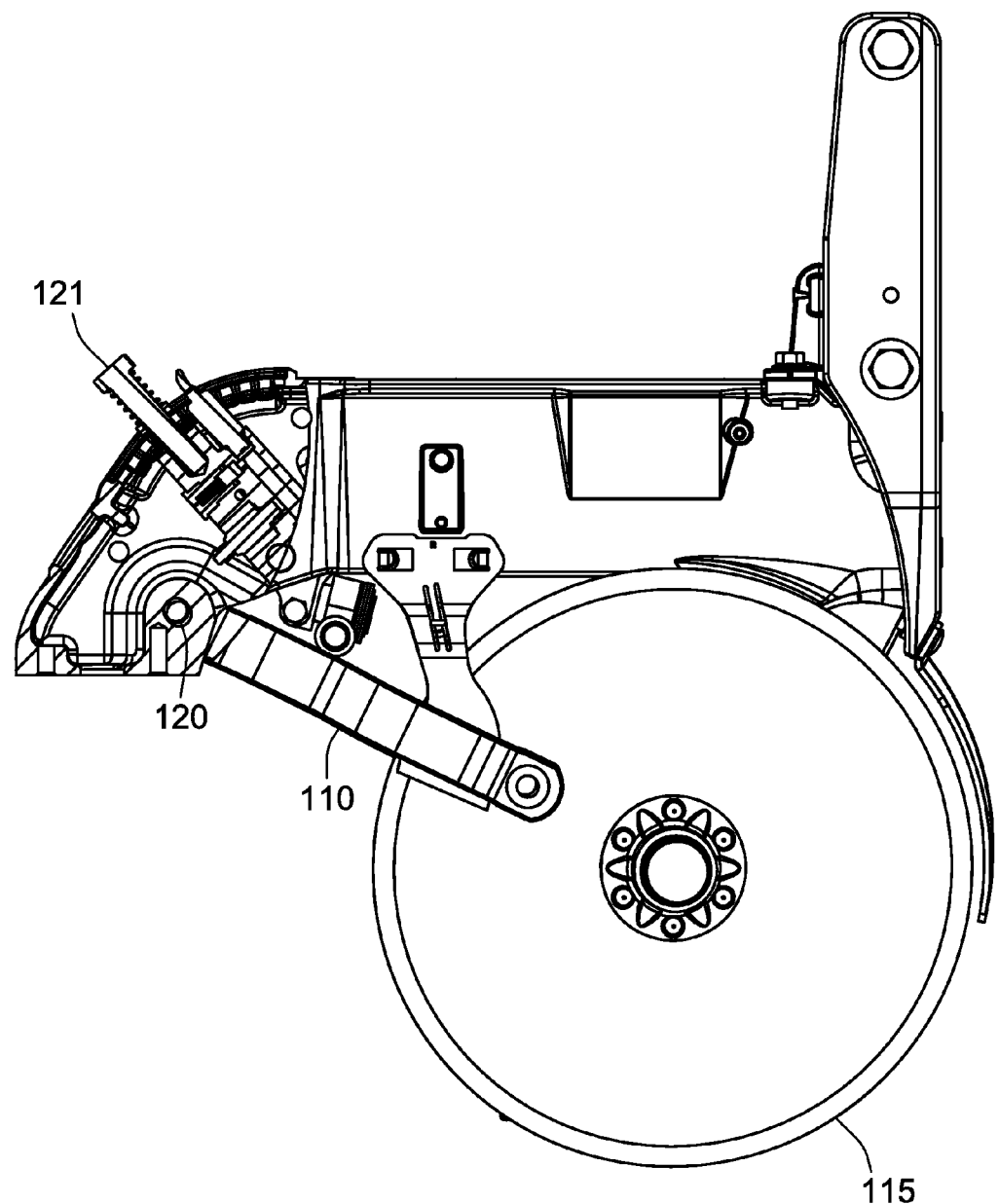
FIG. 13 is a side elevation, partially in section, of the transducer system of FIGS. 10-12 mounted on a gauge wheel and its supporting structure.
Figure 14:
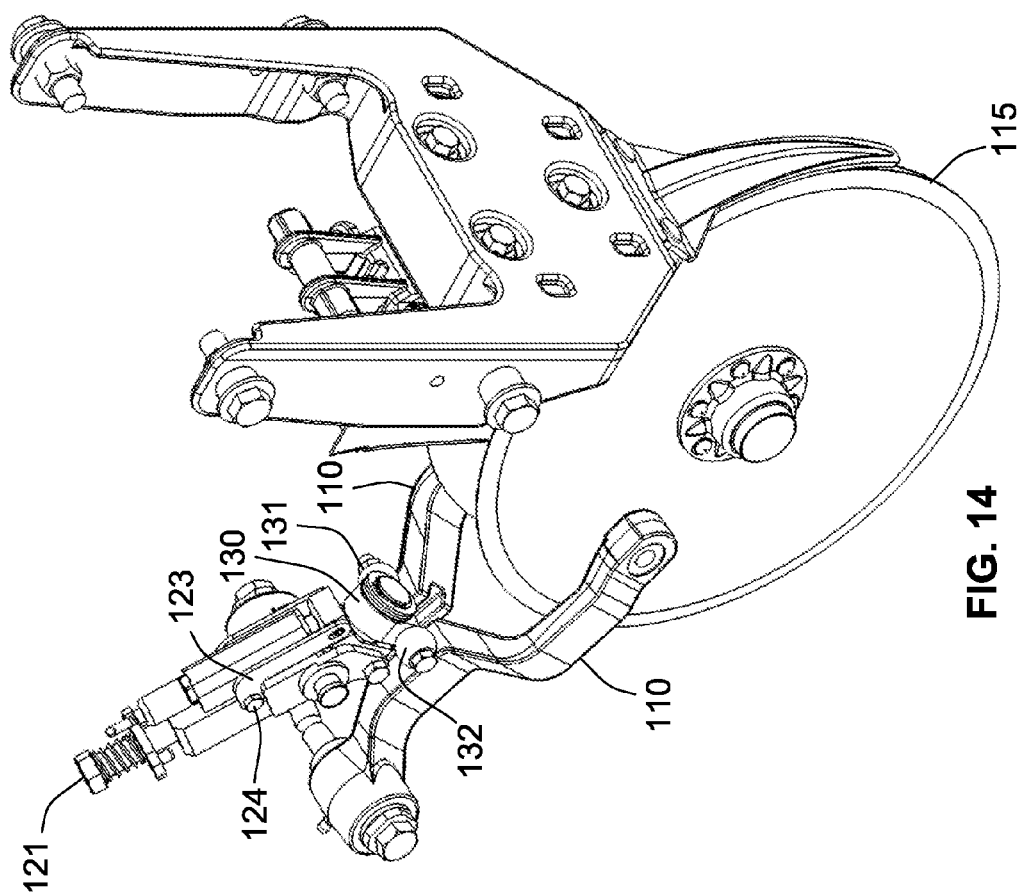
FIG. 14 is a perspective view of portions of the devices shown in FIG. 13.
Figure 15:
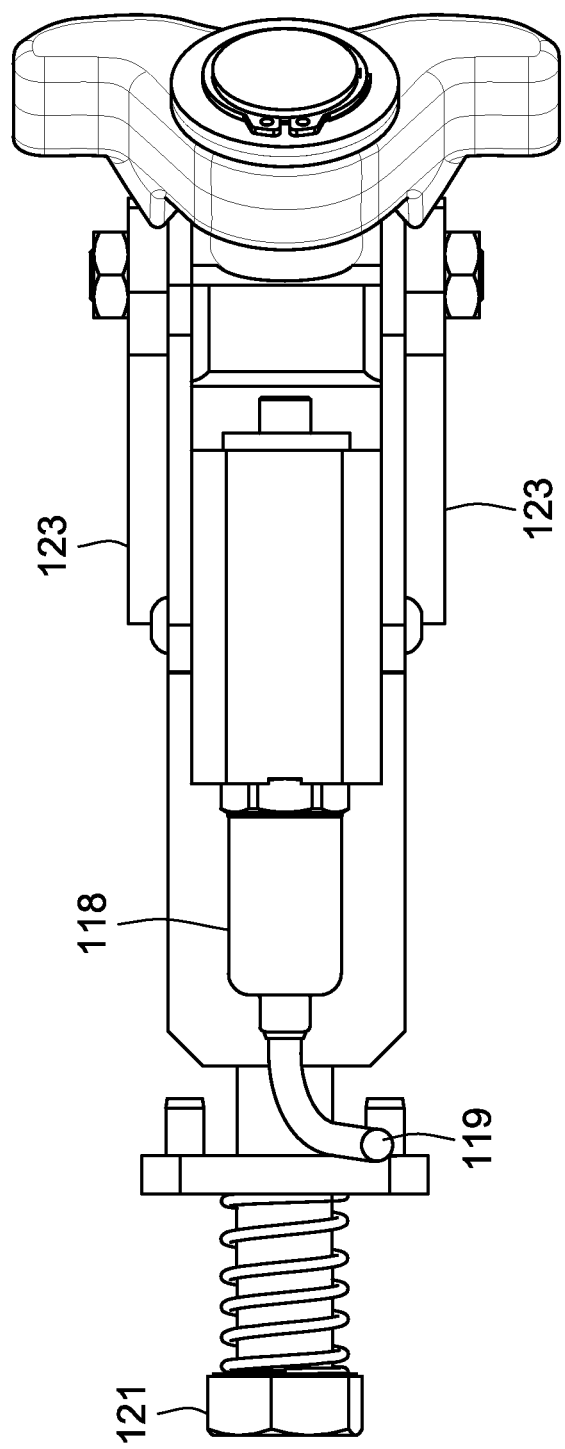
FIG. 15 is a plan view similar to FIG. 10 but with portions removed to show the equalizer arm.

As depicted in FIG. 9, a PWM control system supplies short-duration pulses P to the actuators 2620*a* and 2620*b* of the control valve 2620 to move the valve to either of its two open positions for short intervals corresponding to the widths of the PWM pulses. This significantly reduces the energy required to increase or decrease the pressure in the hydraulic cylinder 2622. In FIG. 9, pulses P1-P3, having a voltage level V1, are supplied to the actuator 2620*b* when it is desired to increase the hydraulic pressure supplied to the hydraulic cylinder 2622. The first pulse P1 has a width T1 which is shorter than the width of pulses P2 and P3, so that the pressure increase is smaller than the increase that would be produced if P1 had the same width as pulses P2 and P3. Pulses P4-P6, which have a voltage level V2, are supplied to the actuator 2620*a* when it is desired to decrease the hydraulic pressure supplied to the hydraulic cylinder 2622. The first pulse P4 has a width that is shorter than the width T2 of pulses P2 and P3, so that the pressure decrease is smaller than the decrease that would be produced if P4 had the same width as pulses P5 and P6. When no pulses are supplied to either of the two actuators 2620*a* and 2620*b*, as in the "no change" interval in FIG. 9, the hydraulic pressure remains substantially constant in the hydraulic cylinder 2622.

FIGS. 10-15 illustrate a modified gauge wheel load sensor that includes an integrated accumulator 122. The purpose of the accumulator 122 is to damp pressure spikes in the sensor when the planter is operating at low gauge wheel loads. When the forces that the gauge wheel support arms 110 are exerting on the hydraulic ram 117 are near zero, it is more common for the surface of the soil or plant residue to create pressure spikes that are large in relation to the desired system sensor pressure. These pressure spikes produce corresponding changes in the vertical position (elevation) of the gauge wheels. As the target gauge wheel down force increases, and consequently the pressure in the fluid chamber 111 and the transducer output voltage from sensor 118, the small spikes of pressure due to variations in the soil surface or plant residue decrease proportionally.

In the present system, rather than have a perfectly rigid fluid coupling between the ram 117 and the pressure transducer 118, as load increases on the ram 117, the fluid first pushes against a piston 125 of the accumulator 122 that is threaded into a side cavity 123 in the same housing that forms the main cavity for the ram 117. The increased pressure compresses an accumulator spring 126 until the piston 125 rests fully against a shoulder on the interior wall of the accumulator housing 127, thus limiting the retracting movement of the accumulator piston 125. At this point, the system becomes perfectly rigid. The amount of motion permitted for the accumulator piston 125 must be very small so that it does not allow the depth of the gauge wheel setting to fluctuate substantially. The piston accumulator (or other energy storage device) allows the amount of high frequency noise in the system to be reduced at low gauge-wheel loads. Ideally an automatic down pressure control system for an agricultural planter should maintain a down pressure that is as low as possible to avoid over compaction of soil around the area of the seed, which can inhibit plant growth. However, the performance of most systems degrades as the gauge wheel load becomes close to zero, because the amount of latent noise produced from variation in the field surface is large in relation to the desired gauge wheel load.

Planter row units typically have a gauge wheel equalizer arm 130 that is a single unitary piece. It has been observed that the friction between the equalizer arm 130 and the gauge wheel support arms 110, as the gauge wheel 115 oscillates up and down, can generate a substantial amount of noise in the sensor. At different adjustment positions, the edges of the equalizer arm 130 contact the support arms 10 at different orientations and can bite into the surface and prevent forces from being smoothly transferred as they increase and decrease. When the equalizer arm 130 is a single unitary piece, there is necessarily a high amount of friction that manifests itself as signal noise in the sensor. This signal noise makes it difficult to control the down pressure system, especially at low levels of gauge wheel load.

Figure 16:
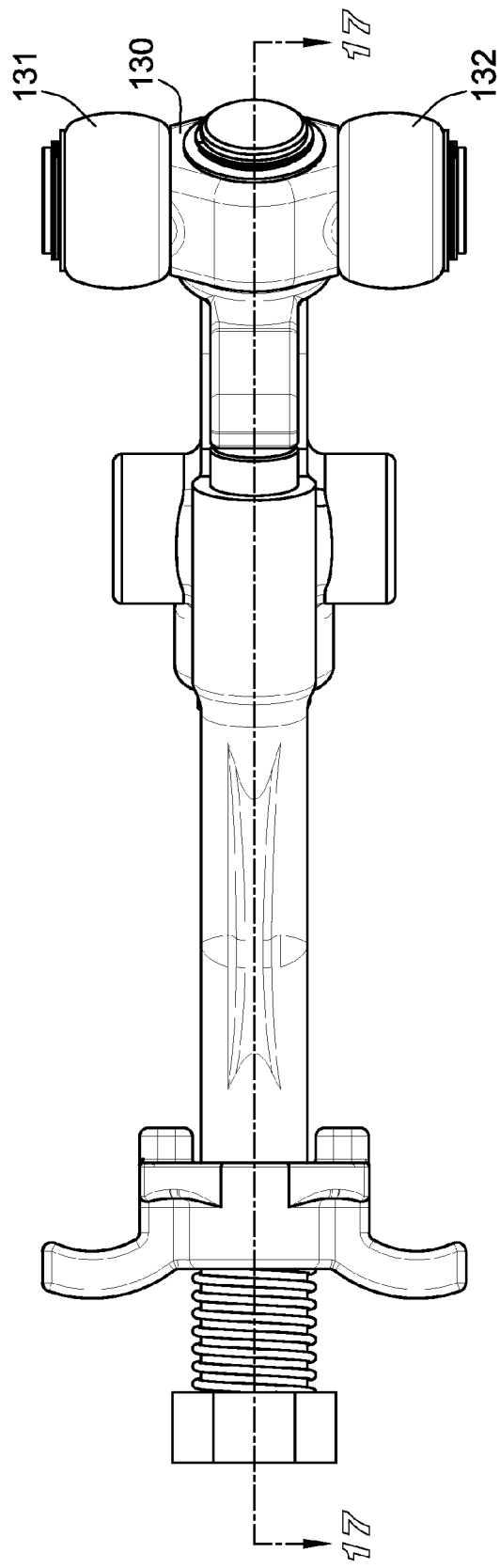
FIG. 16 is a plan view of a modified transducer system.

To alleviate this situation, the equalizer arm 130 illustrated in FIG. 16 has a pair of contact rollers 131 and 132 are mounted on opposite ends of the equalizer arm. These rollers 131 and 132 become the interface between the equalizer arm and the support arms 110, allowing forces to be smoothly transferred between the support arms 110 and the equalizer arm 130. The roller system allows the gauge wheel support arms 110 to oscillate relative to each other without producing any sliding friction between the support arms 110 and the equalizer arm 130. This significantly reduces the friction that manifests itself as signal noise in the sensor output, which makes it difficult to control the down pressure control system, especially at low levels of gauge wheel load.

Figure 17:
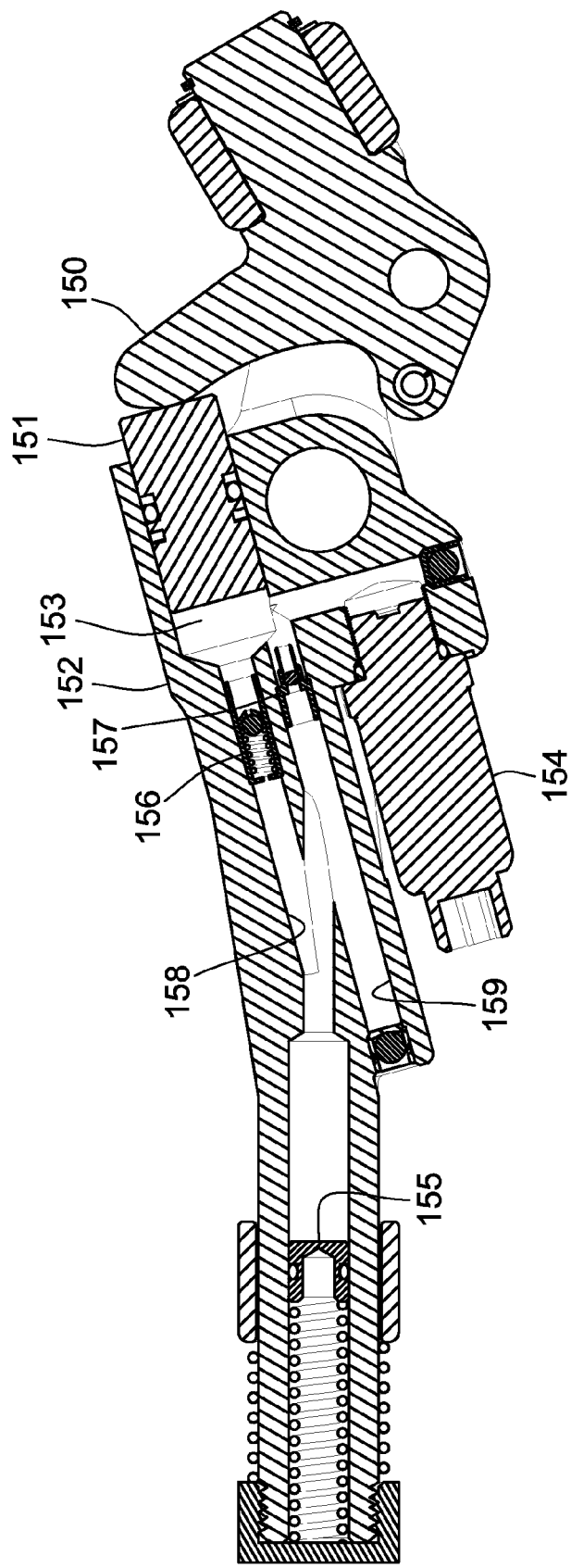
FIG. 17 is a longitudinal section taken along line 17-17 in FIG. 16.

FIG. 17 is a longitudinal section through the device of FIG. 16, with the addition of a rocker arm 150 that engages a ram 151 that controls the fluid pressure within a cylinder 152. A fluid chamber 153 adjacent the inner end of the ram 151 opens into a lateral cavity that contains a pressure transducer 154 that produces an electrical output signal representing the magnitude of the fluid pressure in the fluid chamber 153. The opposite end of the cylinder 152 includes an accumulator 155 similar to the accumulator 125 included in the device of FIG. 9 described above. Between the fluid chamber 153 and the accumulator 155, a pair of valves 156 and 157 are provided in parallel passages 158 and 159 extending between the chamber 153 and the accumulator 155. The valve 156 is a relief valve that allows the pressurized fluid to flow from the chamber 153 to the accumulator 155 when the ram 151 advances farther into the chamber 153. The valve 157 is a check valve that allows pressurized fluid to flow from the accumulator 155 to the chamber 153 when the ram 151 moves outwardly to enlarge the chamber 153. The valves 156 and 157 provide overload protection (e.g., when one of the gauge wheels hits a rock) and to ensure that the gauge wheels retain their elevation setting.

FIGS. 18A and 18B illustrate a modified sensor arrangement for a pair of gauge wheels 160 and 161 rolling on opposite sides of a furrow 162. The two gauge wheels are independently mounted on support arms 163 and 164 connected to respective rams 165 and 166 that control the fluid pressure in a pair of cylinders 167 and 168. A hydraulic hose 169 connects the fluid chambers of the respective cylinders 167 and 168 to each other and to a common pressure transducer 170, which produces an electrical output signal corresponding to the fluid pressure in the hose 169. The output signal is supplied to an electrical controller that uses that signal to control the down forces applied to the two gauge wheels 160 and 161. It will be noted that the two gauge wheels can move up and down independently of each other, so the fluid pressure sensed by the transducer 170 will be changed by vertical movement of either or both of the gauge wheels 160 and 161.

Figure 20:
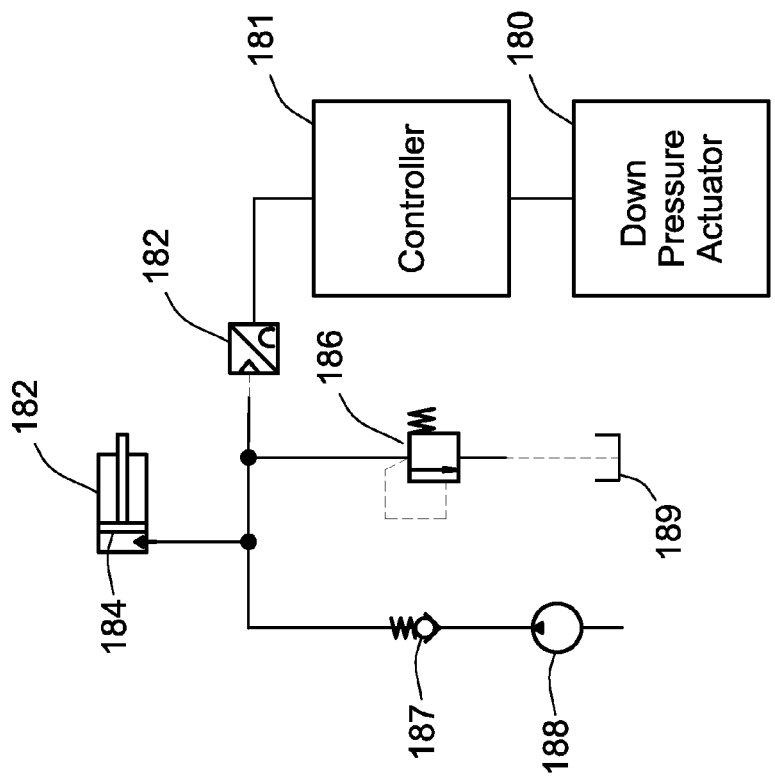
FIG. 20 is a schematic diagram of a first modified hydraulic and electrical control system for controlling a down pressure actuator.
Figure 19:
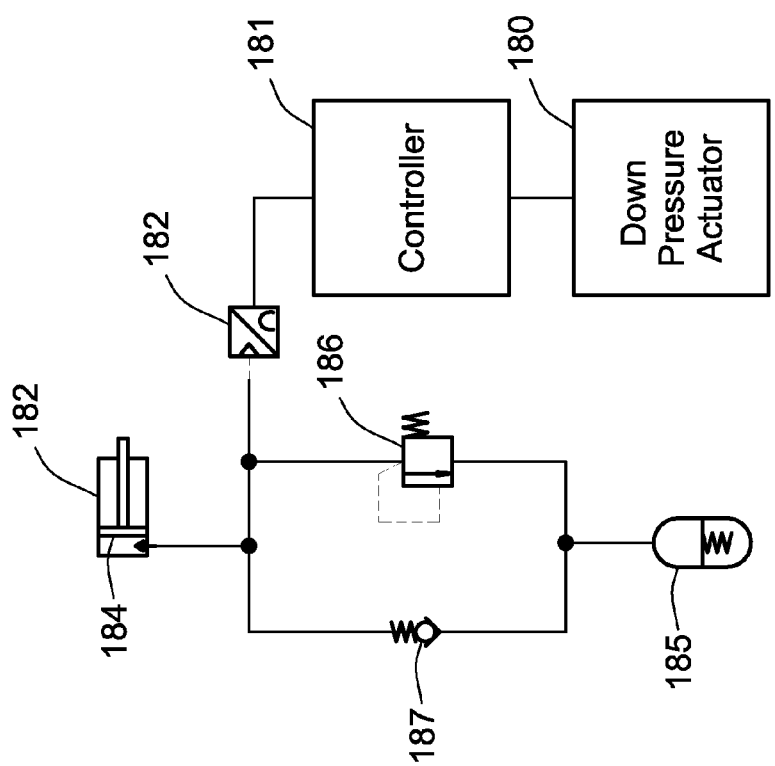
FIG. 19 is a schematic diagram of a hydraulic and electrical control system for controlling a down pressure actuator.

FIGS. 19-22 illustrate electrical/hydraulic control systems that can be used to control a down-pressure actuator 180 in response to the electrical signal provided to a controller 181 by a pressure transducer 182. In each system the transducer 182 produces an output signal that changes in proportion to changes in the fluid pressure in a cylinder 183 as the position of a ram 184 changes inside the cylinder 183. In FIG. 19, the pressurized fluid chamber in the cylinder 183 is coupled to an accumulator by a relief valve 186 to allow pressurized fluid to flow to the accumulator, and by a check valve 187 to allow return flow of pressurized fluid from the accumulator to the cylinder 183. In FIG. 20, the accumulator 185 is replaced with a pressurized fluid source 188 connected to the check valve 187, and a sump 189 connected to the relief valve 186. In FIG. 21, the accumulator 185 is connected directly to the pressurized fluid chamber in the cylinder 183, without any intervening valves. In the system of FIG. 22, the pressure sensor 182 is connected directly to the pressurized fluid chamber in the cylinder 183.

While particular embodiments and applications of the present invention have been illustrated and described, it is to be understood that the invention is not limited to the precise construction and compositions disclosed herein and that various modifications, changes, and variations can be apparent from the foregoing descriptions without departing from the spirit and scope of the invention as defined in the appended claims.

The invention claimed is:
1. An agricultural planter having a row unit that includes
a pivotably mounted gauge wheel,
a down pressure controller for controlling the down pressure on at least a portion of the row unit,
a mechanical element mounted for movement in response to the down pressure applied to the row unit,
a fluid-containing device coupled to said mechanical element for changing the fluid pressure in response to changes in the downward pressure applied to the row unit, and
a transducer coupled to said fluid-containing device for producing an output signal in response to changes in said fluid pressure.

2. The gauge wheel load sensor of claim 1 in which said fluid-containing device is a hydraulic cylinder containing pressurized fluid and a ram coupled to said gauge wheel so that said ram changes the fluid pressure within said cylinder in response to vertical movement of said gauge wheel.

3. The gauge wheel load sensor of claim 2 in which said ram is coupled to said gauge wheel so that said ram is advanced within said cylinder to increase said fluid pressure only in response to a change in the down force on said gauge wheel.

4. The gauge wheel load sensor of claim 1 which includes an accumulator coupled to the portion of said fluid-containing device where said fluid pressure increases in response to the movement of said of said mechanical element.

5. The gauge wheel load sensor of claim 4 in which said mechanical element is a ram in a hydraulic cylinder containing pressurized fluid, said ram is coupled to said gauge wheel so that said ram is moved within said cylinder in response to vertical movement of said gauge wheel, and which includes an accumulator coupled to said hydraulic cylinder for receiving a portion of said pressurized fluid.

6. The gauge wheel load sensor of claim 5 in which said accumulator includes a ram in a cavity that receives said pressurized fluid.

7. The gauge wheel load sensor of claim 5 in which said accumulator damps changes in the pressure of said fluid in response to vibratory movement of said ram.

8. An agricultural planter having a row unit that includes
a pivotably mounted gauge wheel,
a down pressure controller for controlling the down pressure on at least a portion of the row unit,
a mechanical element mounted for movement in response to the downward force applied to the row unit,
a fluid-containing device coupled to said mechanical element for changing the fluid pressure in said device in response to changes in the downward pressure applied to the row unit,
a transducer coupled to said fluid-containing device for producing an output signal in response to changes in said fluid pressure, and
an energy storage device coupled to said fluid-containing device for receiving a limited amount of fluid in response to changes in said fluid pressure to damp pressure spikes in the output signal of said transducer.

9. The gauge wheel load sensor of claim 8 in which said fluid-containing device is a hydraulic cylinder, and said movable element is a piston in said cylinder.

10. The gauge wheel load sensor of claim 8 in which said energy storage device is an accumulator receiving pressurized fluid from said fluid-containing device, said accumulator containing a movable element responsive to the pressure of the fluid received from said fluid-containing device.

\* \* \* \* \*